Figure 1:
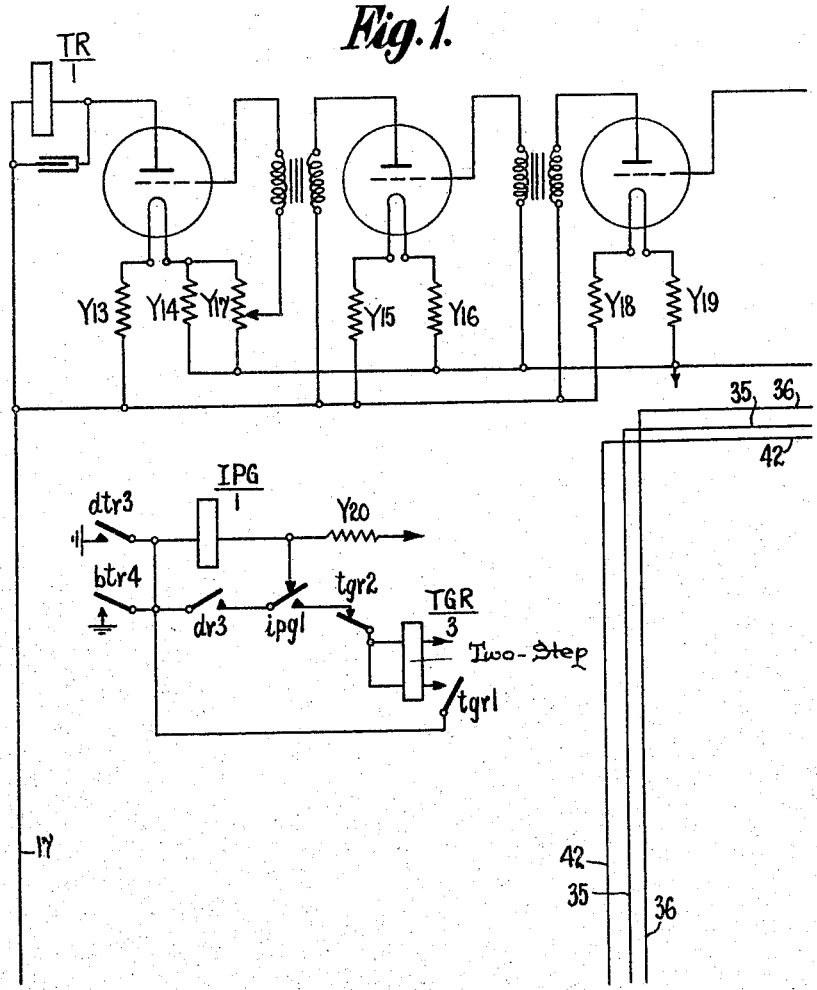

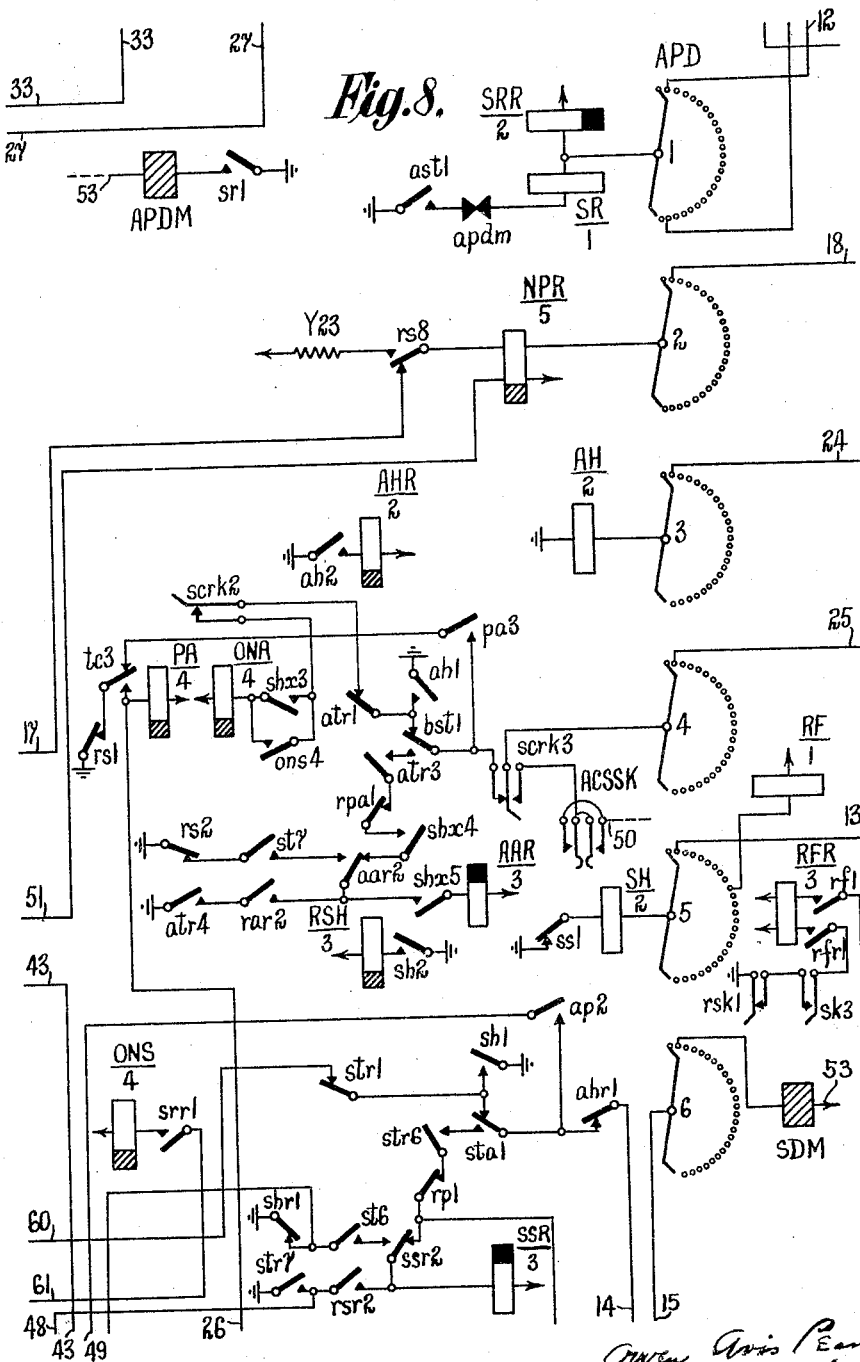

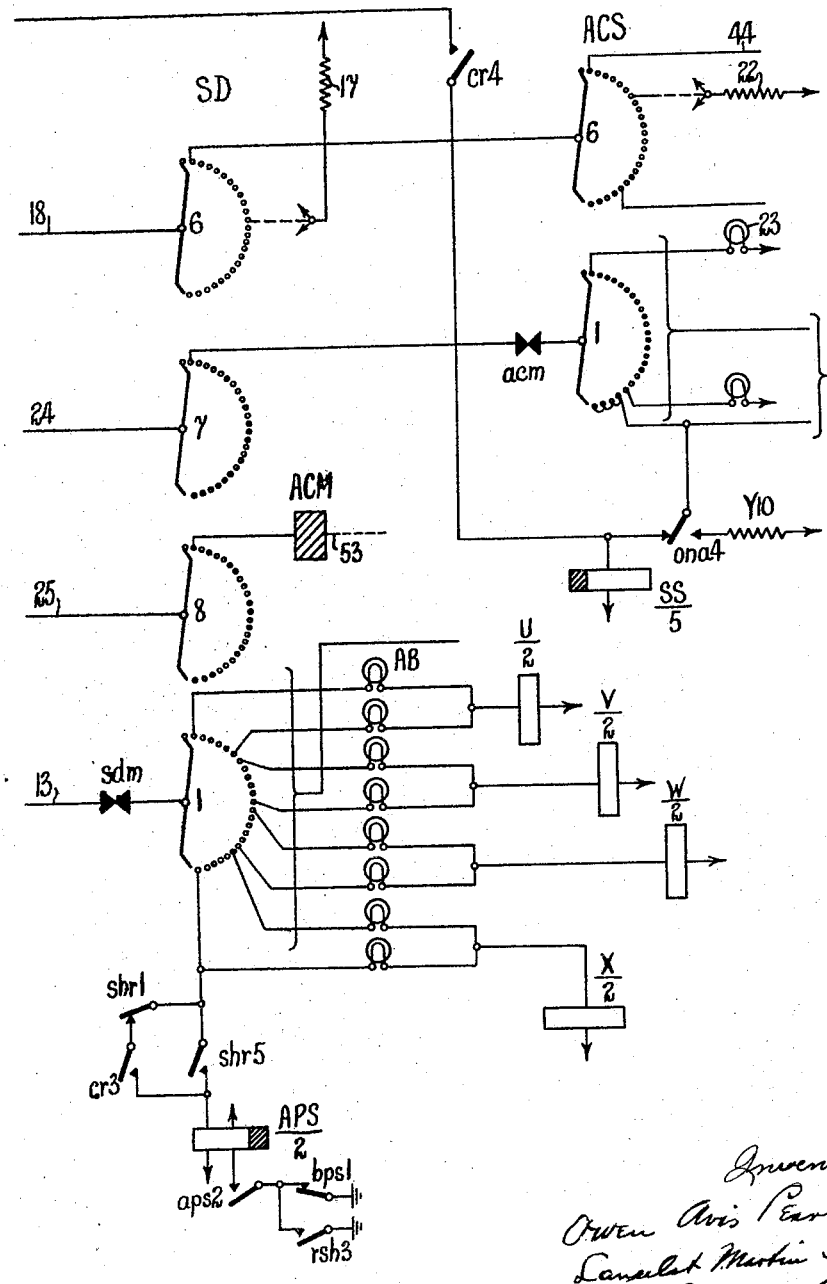

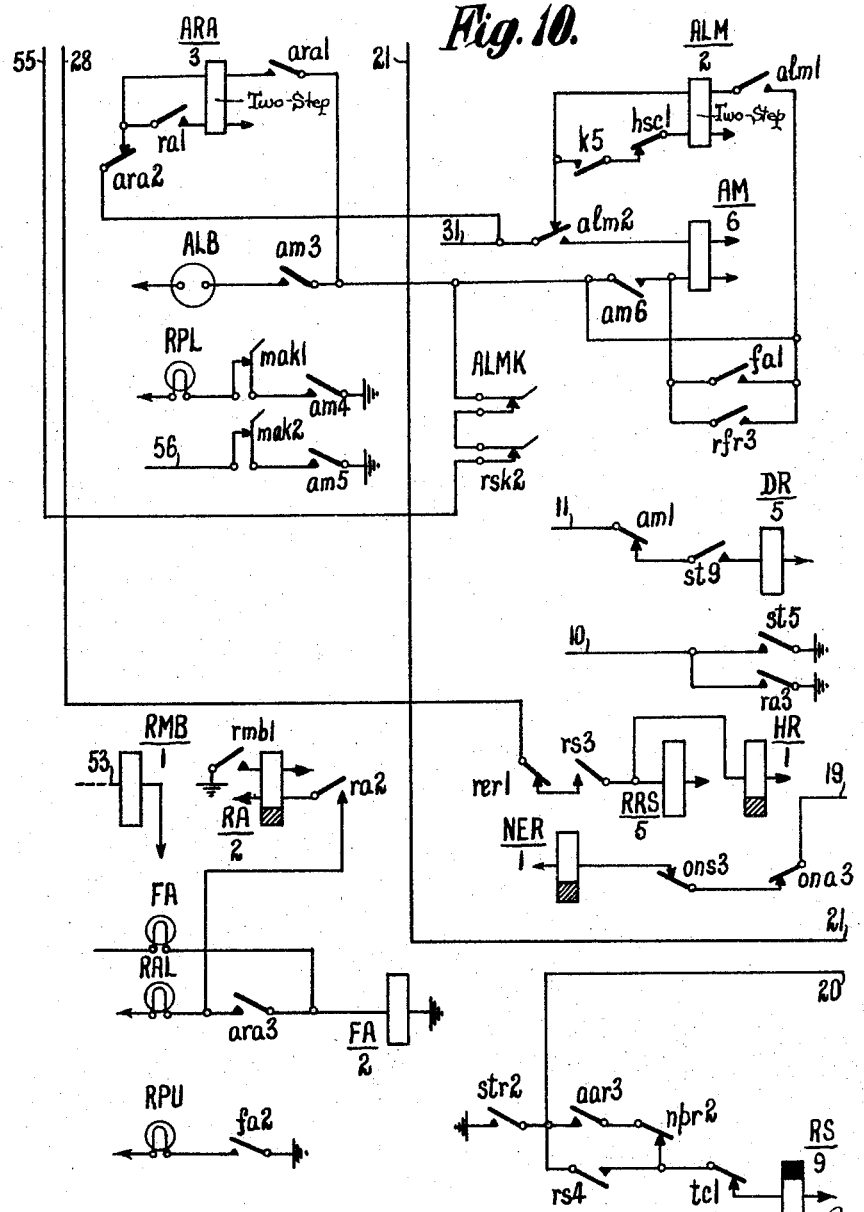

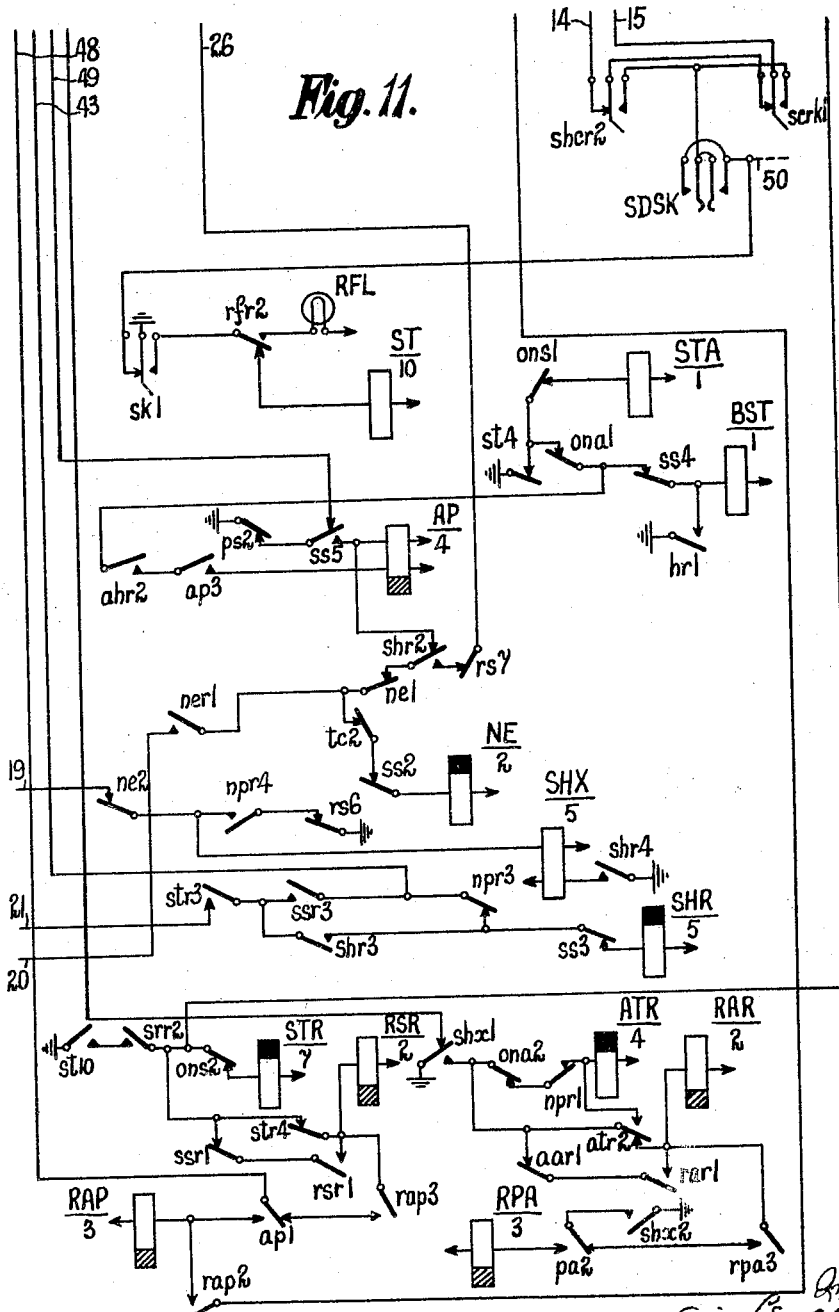

Patented Nov. 22, 1932

1,888,964

UNITED STATES PATENT OFFICE

OWEN AVIS PEARCE, OF LIVERPOOL, AND LANCELOT MARTIN SIMPSON, OF STANKS, NEAR LEEDS, ENGLAND, ASSIGNORS TO ASSOCIATED TELEPHONE AND TELEGRAPH COMPANY, OF CHICAGO, ILLINOIS, A CORPORATION OF DELAWARE

TELEPHONE SYSTEM

Application filed May 24, 1930, Serial No. 455,352, and in Great Britain June 6, 1929.

The present invention relates to telephone systems and is more particularly concerned with routining apparatus, that is to say, apparatus designed to simulate for test purposes the conditions which will be encountered by certain apparatus under normal conditions of working and to give an indication of any irregularity which may occur due to faulty operation of the apparatus. It is an object of the invention to provide routining apparatus for testing group selector switches of the step-by-step vertical and rotary type the normal operation of which is well known to those skilled in the telephone art.

The routining apparatus is arranged to deal successively with a large number of group selectors by arranging that access to the group selectors is obtained by way of a primary rotary-lineswitch distributor, which in turn has access to 24 similar secondary distributors. Each secondary distributor has outlet to 24 rotary-lineswitch access switches, each of which is capable of establishing connection with conveniently 20 group selector switches. The number happens in this particular case to be the total capacity of a group selector shelf. The general scheme of operation is that once the routiner is started, each group selector in turn is subjected to a series of tests and the operation continues automatically until all have been dealt with unless a fault is found. In this case the routining operation is stopped and suitable lamps indicate the particular group selector on which a fault has been located, and also the nature of the fault.

The invention will be better understood from the following description of one method of carrying it into effect, reference being had to the accompanying drawings comprising Figs. 1 to 11 inclusive. It will be understood, however, that this is given by way of example only and that various modifications could be made by those skilled in the art without departing from the spirit of the invention.

In order to give a general idea of the various tests which are made upon each group selector the following summary shows the tests made in various positions of the test switch.

(2) Release trunk for earth prior to seizing.
(3) Positive line for contact with earth or battery. Negative line for contact with earth or battery. Positive and negative lines for reversal.
(7) Operation of impulse accepting relay according to adjustment limits.
(8) Non-operation of impulse accepting relay according to adjustment limits.
(9) Dial tone in the case of first selectors.
(11) Timing of the guard relay on release.
(13) Vertical magnet impulsing with resistance in the loop and no shunt.
(14) Automatic step-in on correct level.
(15) Busy tone from the 11th step.
(17) Vertical magnet impulsing with zero loop (18) and shunt resistance.
(19) Permits the group selector to test the selected level and if all trunks are busy releases the switch and again repeats the vertical impulses. This cycle of operations is repeated until the selector finds a free trunk.
(22) Operation of the switching relay.
(23) Tests the trunks to the switch ahead taken by the group selector for: Earth returned over private. Negative line for contact with battery or earth. Positive line for contact with battery or earth. Positive and negative lines for reversal.

Referring now to the accompanying drawings, Figs. 1 to 11 which should be arranged as shown on the key sheet drawing Fig. 12 when the interconnecting lines will be found to be in alignment and a complete circuit of the invention is thus obtained.

Figure 2:
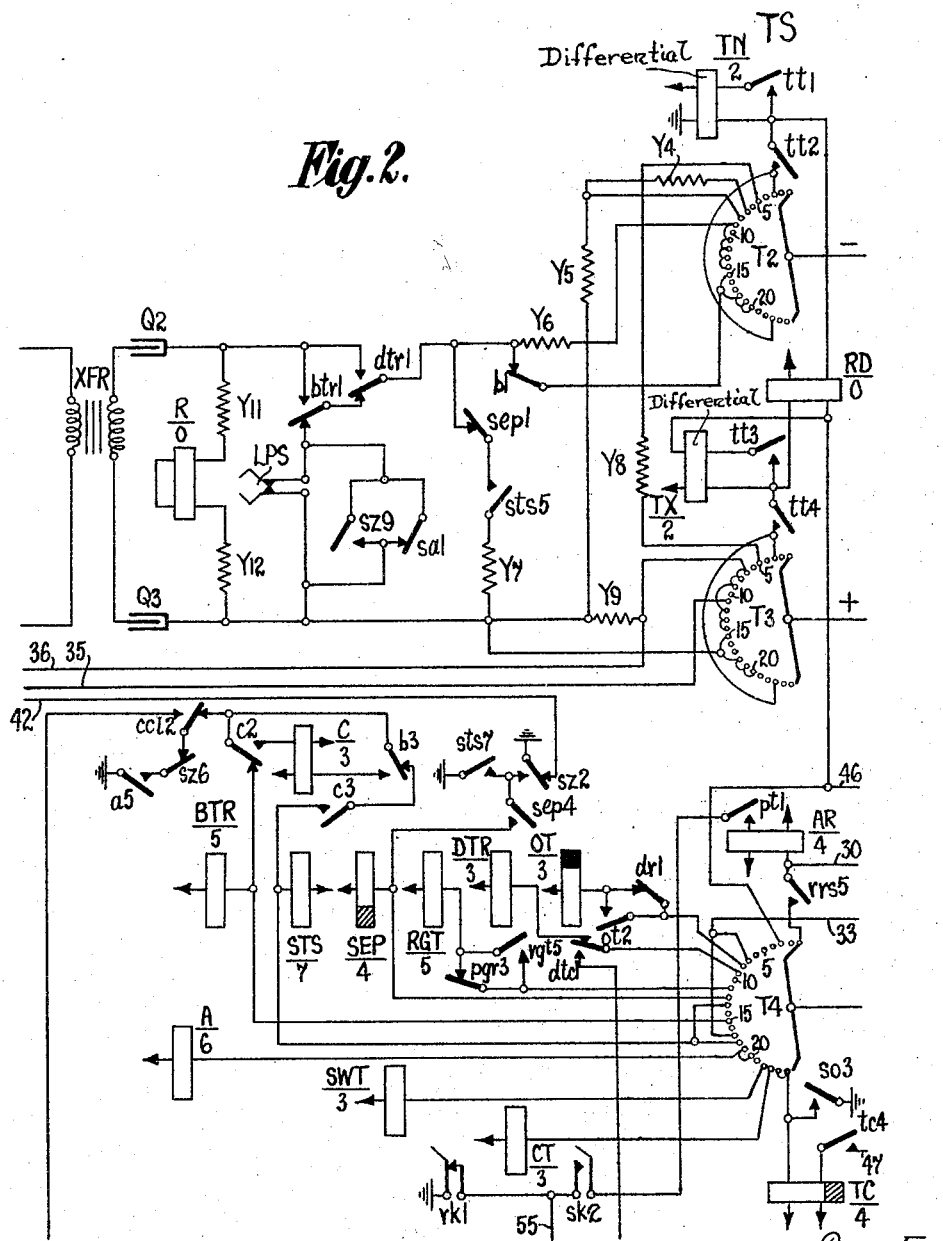
Figure 3:
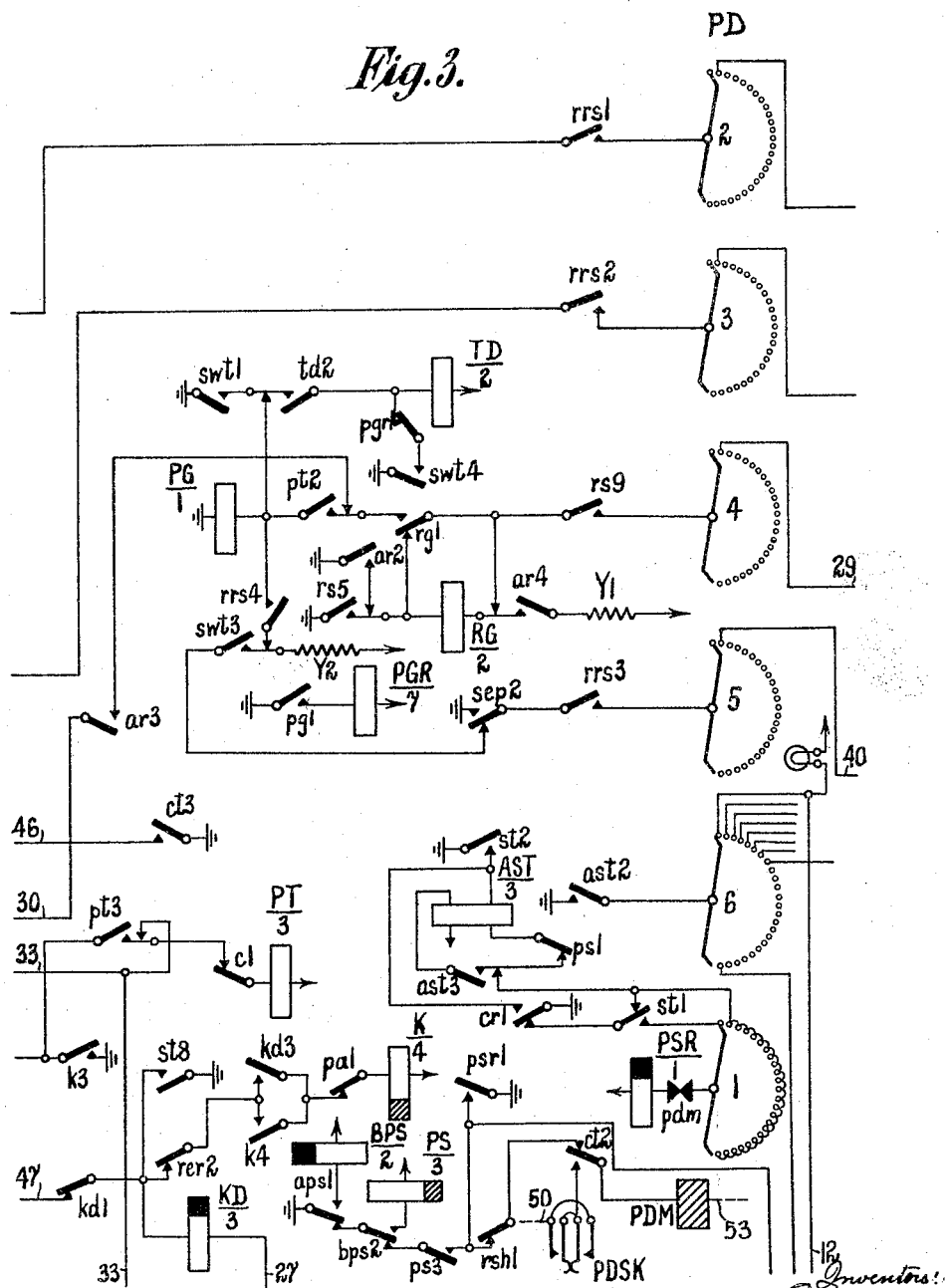
Figure 4:
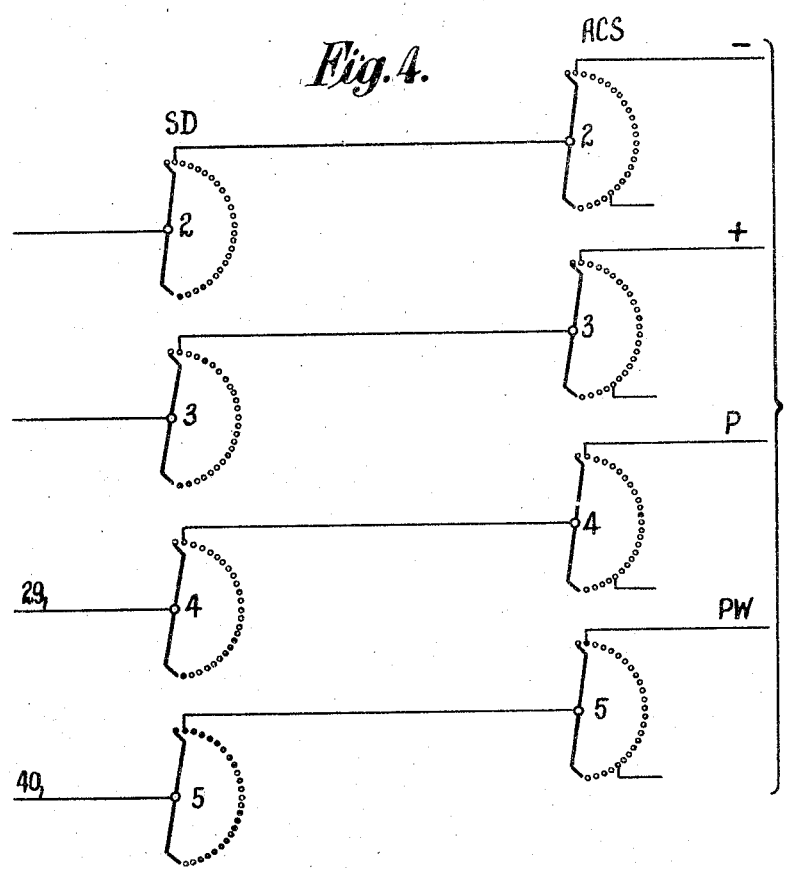
Figure 5:
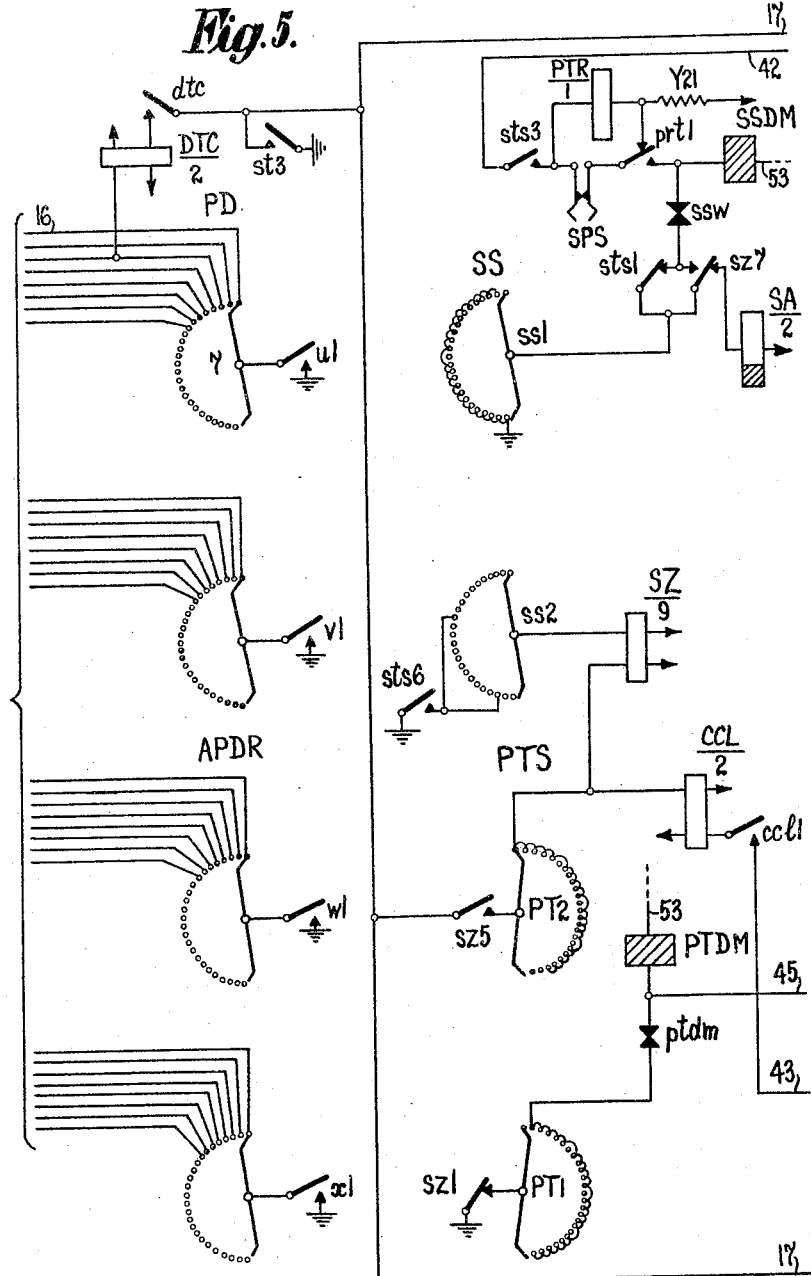
Figure 6:
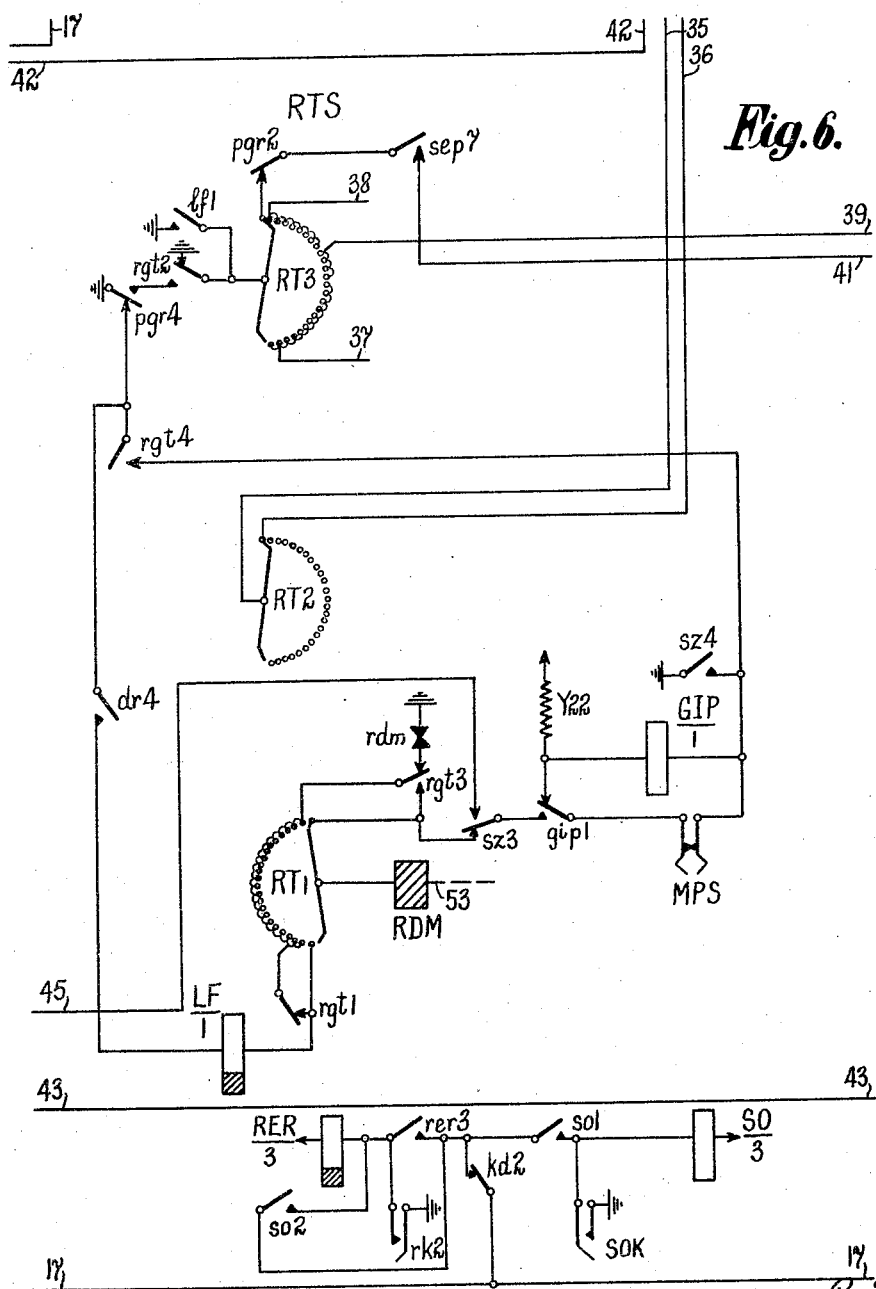
Figure 7:
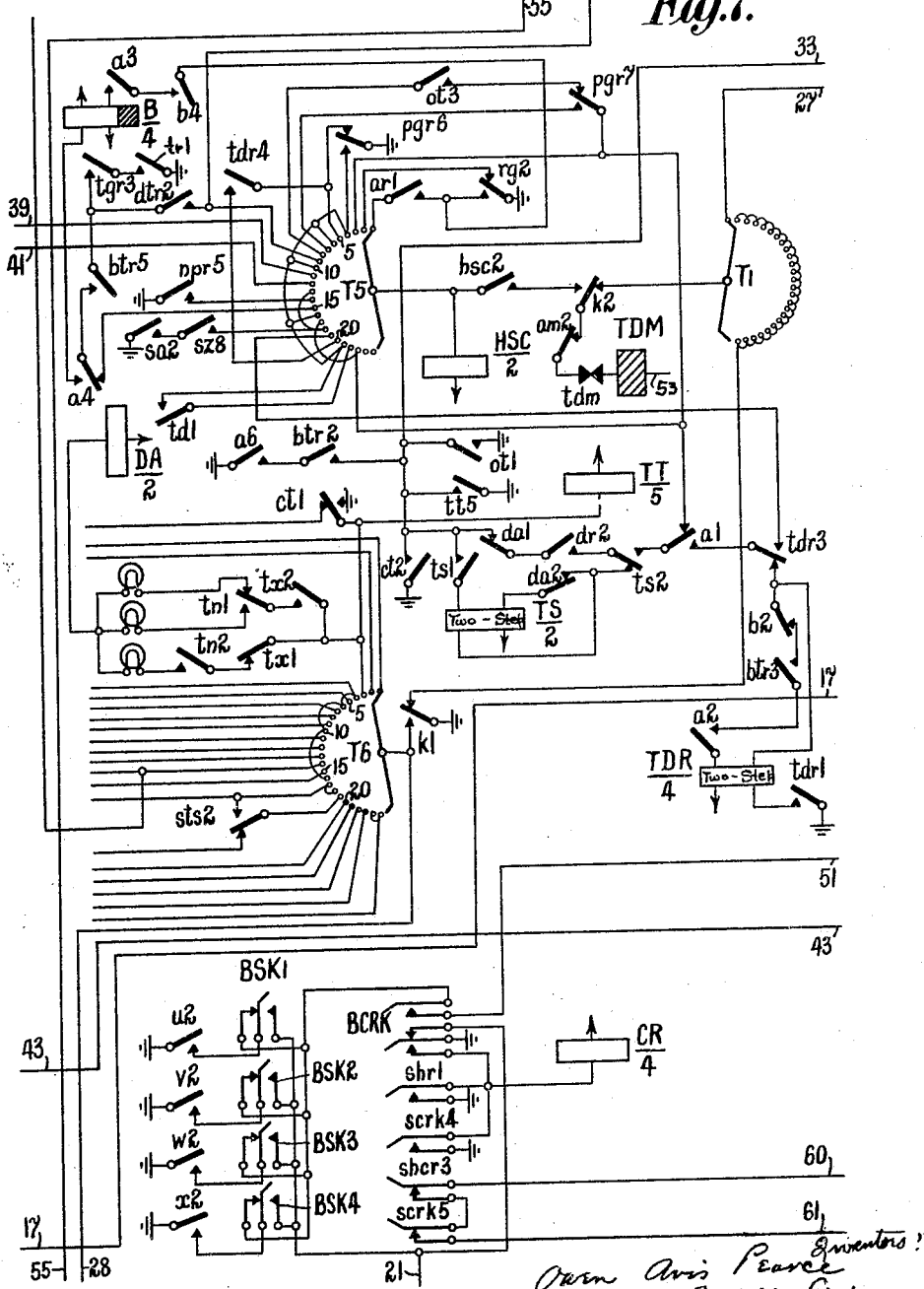

Fig. 1 shows the valve amplifier circuit and alternating current relay TR by means of which a physical registration of the correct reception of the well known indicating tones from the group selectors is produced. Fig. 2 shows a portion of the test switch TS which is arranged to control the application of various test conditions and also several controlling relays associated therewith. Fig. 3 shows the primary distributor PD capable of establishing connection with 25 secondary distributor switches, Fig. 4 shows portion of the secondary distributor switch SD capable of establishing connection with 25 access switches such as ACS the upper portion of which is also shown. Fig. 5 shows a portion of the primary distributor PD and auxiliary primary distributor APD which control the lighting circuits of the bay indicating lamps while the sender switch SS and the pause timing switch PTS are also shown, the former controlling the sending of the impulses to the group selector under test, and the latter timing the automatic rotation speed of the switches; Fig. 6 shows the release timing switch RTS which measures the releasing period of the guard relay in the group selector switch, and also the reset key and the step-on key. Fig. 7 shows the lower portion of the test switch TS together with sundry continuous routine keys and bay selecting keys. Fig. 8 shows the auxiliary primary distributor switch APD which is controlled from the primary distributor PD, Fig. 8. Fig. 9 shows the remaining portion of the secondary distributor switch SD and the access switch ACS. Fig. 10 shows certain timing relay combinations, and various alarm circuits which are operable therefrom, while finally Fig. 11 shows various controlling relays associated with the invention together with sundry keys.

In order to make the description clearer a list will now be given of the various keys employed: start key $sk1$ (Fig. 11), $sk2$ (Fig. 2), $sk3$ (Fig. 8); restart key $rsk1$ (Fig. 8), $rsk2$ (Fig. 10); reset key $rk1$ (Fig. 2), $rk2$ (Fig. 6); step on key SOK (Fig. 6); primary distributor stepping key PDSK (Fig. 3); secondary distributor stepping key SDSK (Fig. 11); access switch stepping key ACSSK (Fig. 8); bay stepping keys BSK1, BSK2, BSK3 and BSK4 (Fig. 7); switch continuous routine key $scrk1$ (Fig. 11), $scrk2$ and $scrk3$ (Fig. 8), $scrk4$ and $scrk5$ (Fig. 7); shelf continuous routine key $shcr1$ (Fig. 7), $shcr2$ (Fig. 11), $shcr3$ (Fig. 7); bay continuous routine key BCRK (Fig. 7; main alarm key $mak1$ and $mak2$ (Fig. 10) alarm cut-off key ALMK (Fig. 10).

The actual routining operation performed on each group selector will now be described with reference to the assembled circuit. It should first of all be mentioned that in addition to the two speaking conductors and the private conductor generally accessible to a preceding switch, the group selectors under test are arranged so that a fourth conductor connected to the private wiper and a fifth conductor connected to normal post springs are also provided accessible to the routiner.

To start the routining of all the group selectors in the exchange, the start key SK (Fig. 11) is operated thereby at its resting contact disconnecting the operating earth from the various stepping keys which will be described later, and at its operated contact extends earth by way of the resting contact of armature $rfr2$ to the start relay ST. Relay ST in operating, at its armature $st4$ (Fig. 11) completes the circuits of relays STA and BST, at armature $st5$ (Fig. 10) extends earth over conductor 10 which is the motor start lead, and at armature $st9$ completes the circuit to relay DR, so that earth impulses at conveniently the rate of .75 of a second on and .75 of a second off, are extended over conductor 11 from the motor cams in order to cause relay DR to impulse in synchronism. At armature $st1$ (Fig. 3) the following circuit may be traced to relay PSR; earth, armature $cr1$ operated armature $st1$, first bank contact and wiper 1 of the primary distributor PD, interrupter springs $pdm$, of the associated driving magnet PDM, winding of relay PSR to battery. Relay PSR operates over the circuit described and extends earth at its armature $psr1$, resting contacts of armatures $rsh1$ and $cr2$, winding of the primary distributor driving magnet PDM over conductor 53 which as will be explained later is connected to battery through the winding of relay RMB, thereby causing the magnet to become energized so that it opens the circuit of relay PSR at interrupter springs $pdm$. Relay PSR releases and opens the circuit to the driving magnet PDM which thereupon releases and moves the wipers of the switch PD onto the second set of bank contacts. In this position a circuit may be traced to relay AST as follows: earth, operated armature $st2$, righthand winding of relay AST, resting contacts of armatures $ps1$, $ast3$, second bank contact and wiper 1, interrupter springs $pdm$, winding of relay PSR to battery. Relay AST is thereupon operated over the circuit described and at armature $ast3$ completes a locking circuit for itself over both its windings in series to earth at armature $st2$; it must be mentioned that owing to the high resistance of the righthand winding of relay AST, relay PSR is not operated in the foregoing circuit.

Since the number of wires which it is required to extend from the primary distributor switch is greater in number than can be accommodated on the banks of a single switch, an auxiliary primary distributor designated APD has been provided and the method of synchronizing this auxiliary switch with the controlling primary distributor switch PD will now be described.

Returning now to the operation of relay AST, earth at the operated armature $ast1$ (Fig. 8) will be connected via the interrupter springs $apdm$ of the auxiliary primary distributor magnet APDM, winding of relays SR and SRR in series to battery. Relay SR which is of high resistance, operates in this circuit, but relay SRR does not operate; at armature $sr1$ a circuit is completed to the auxiliary primary distributor driving magnet APDM. Magnet APDM operates and opens the associated interrupter springs $apdm$ thereby opening the circuit to relay SR which accordingly releases and in turn opens the circuit to the driving magnet APDM so that the wipers of the auxiliary primary distributor APD are moved onto the second set of bank contacts. Interaction between relay SR and magnet PDMA causes the wipers of the switch APD to be automatically rotated until wiper 1 encounters the bank contact corresponding to that engaged by wiper 6 of the controlling primary distributor PDR and in this position a circuit may be traced as follows: earth, operated armature ast2 (Fig. 3), wiper 6 and bank contact, conductor 12, second bank contact of auxiliary primary distributor switch, wiper 1 to the junction point relays SR and SRR. By this means the interrupter relay SR is short-circuited by the connection of earth to the battery side of its winding and since the relay SRR now receives full earth potential it will operate. As the wipers of the primary distributor PD and the auxiliary primary distributor APD are both standing on the second set of bank contacts, connection is completely established with the first secondary distributor switch SD, the upper portion of which is shown in Fig. 4, and the lower portion of which is shown in Fig. 9.

If now the wipers of the secondary distributor switch are standing off their home position at this instant, a circuit may be traced as follows: earth, armature ss1 (Fig. 8) winding of relay SH, wiper 5 and second bank contact of the switch APD, conductor 13, interrupter springs sdm of the secondary distributor switch SD, wiper 1 and associated bank contact via the shelf indicating lamp such as AB in series with a relay such as relay U to battery. Relays SH and U operate and relay SH at armature sh1 (Fig. 8) extends earth via resting armature str1, conductor 60, resting contacts of continuous routine key (Fig. 7), conductor 61, operated armature srr1, winding of relay ONS to battery. Relay ONS thereupon operates very quickly and at armature ons2 (Fig. 11) opens the circuit of the slow-to-operate relay STR before it has time to operate; since it will be appreciated that the circuit of relay STR was completed upon the operation of armature srr2. Relay ONS, moreover, at armature ons1 (Fig. 11) opens the circuit to relay STA which accordingly releases and causes the following circuit to become effective: earth, operated armature sh1 (Fig. 8), resting armatures sta1 and ahr1, conductor 14, resting springs on continuous routine keys, conductor 15, wiper 6 and second bank contact of the switch APD, winding of the secondary distributor driving magnet SDM to battery. The magnet SDM accordingly energizes and at its interrupter springs sdm (Fig. 9), opens the holding circuit to relay SH, which thereupon releases and in turn opens the energizing circuit to the driving magnet SDM and to relay ONS at armature sh1, magnet SDM releases to advance the wipers of the secondary distributor switch onto the next set of bank contacts, since relay ONS is equipped with a copper slug it remains operated during the movement of the wipers of the secondary distributor. Interaction between relay SH and the secondary distributor driving magnet SDM will cause the wipers of the secondary distributor to be automatically rotated until wiper 1 encounters the disconnected home bank contact and when this position is reached relay SH cannot again operate and the wipers are held in this position and relay ONS releases after its slow period has elapsed.

Upon the release of armature ons1, relay STA (Fig. 11) is re-operated, while at armature ons2, earth is against connected to the slow-to-operate relay STR to effect its operation (Fig. 11). If relay RSR is not already operated it is now permitted to do so during the slow operating period of relay STR, so that it then locks up by way of its armature rsr1, independent of relay STR. When both relays STR and RSR have fully operated, earth at the operated armature str7 (Fig. 8) is extended by way of armature rsr2, to the winding of slow-to-operate relay SSR, and during the slow operating period of this latter relay an impulse is delivered to the driving magnet of the secondary distributor switch SD over the following circuit: earth, operated armatures str7, rsr2, resting contacts of armatures ssr2 and rp1, operated armatures str6 and sta1, resting armature ahr1, conductor 14, resting contacts of continuous routine keys, conductor 15, wiper 6 and second bank contacts, winding of the driving magnet SDM to battery. The magnet SDM thereupon energizes to prepare for the advancement of the associated wipers onto the second set of bank contacts; upon the complete operation of relay SSR the magnet circuit is opened at armature ssr2 and the advancement of the wipers then takes place. Connection is thereby established over the wipers 1 to 8 with the first access switch ACS, and the lamp AB, Fig. 9, is lit in series with relay SH over the circuit previously traced to indicate that group selector shelves A and B are about to be routined and, furthermore, since relay U is also operated in the lamp circuit earth at armature u1 (Fig. 5) is connected to wiper 7 of the primary distributor switch, which it will be remembered is resting on the second set of bank contacts and earth is thus projected over conductor 16, to light an indicating lamp corresponding to the bay in which the shelves AB are located. If now the shelves A and B happen to be unequipped, wiper 6 of the secondary distributor SD will encounter battery connected through resistance 17 which is commoned to all unequipped positions, and the following circuit is completed to relay NPR (Fig. 8): earth, operated armature *st*3 (Fig. 5), conductor 17, resting contact of armature *rs*8 (Fig. 8), upper winding of relay NPR, wiper 2 and second bank contact, conductor 18, wiper 6 and second bank contact to battery via resistance 17. Relay NPR thereupon operates very quickly and at armature *npr*3 opens the energizing circuit to the slow-to-operate relay SHR (Fig. 11) before the latter has time to operate, since it will be seen that this circuit was completed at substantially the same instant by the operation of armature *ssr*3. Relay NPR in operating completes a circuit from earth at the resting armature *rs*6 (Fig. 11), operated armature *npr*4, armature *ne*2, conductor 19, resting armatures *ona*3 and *ons*3, winding of relay NER to battery, while in parallel thereto from the operated armature *npr*4 a circuit may also be traced to the upper winding of relay SHX. Relays NER and SHX operate but the operation of relay SHX is without function at this stage. Relay NER in operating extends earth from the operated armature *str*2 (Fig. 10), conductor 20, armature *ner*1, resting armatures *tc*2 and *ss*2, winding of slow-to-operate relay NE to battery, and in parallel by way of the resting armatures *ne*1 and *shr*2, upper winding of relay AP to battery. Relay AP being fast to operate makes its armature *ap*2 before relay NE can operate, and completes the following circuit: earth, resting armatures *ps*2 and *ss*5, conductor 49, armature *ap*2, by way of the circuit previously traced to the driving magnet SDM of the secondary distributor switch to battery, so that the magnet becomes energized to prepare for the advancement of the wipers. Relay NE will of course operate when its slow period has elapsed and at armature *ne*2 opens the circuit to relay NER (Fig. 10), and at armature *ne*1 opens the circuit to relay AP which accordingly releases and opens the circuit of the magnet SDM so that the wipers of the secondary distributor switch are advanced onto the next set of bank contacts. Relay NER will also release at the conclusion of its slow period and at armature *ner*1 opens the energizing circuit to relay NE so that this latter relay will also release and again complete the circuit to relay NER, upon the re-operation of which circuits are again completed to relays AP and NE in parallel. Interaction between relays NER, AP and NE will cause impulses to be delivered to the secondary distributor driving magnet SDM, so that the wipers are advanced in search of an equipped shelf as indicated by the absence of battery potential on the contacts associated with wiper 6. When the wipers of the secondary distributor are moved into engagement with an equipped shelf, relay NPR will release due to the absence of battery on wiper 6, and at its armature *npr*4 opens a point in the circuit of relay NER thereby preventing further interaction of relays NER, NE and AP. As relay NPR is now released for a definite period, the following circuit now becomes effective; battery, winding of relay SHR (Fig. 11), resting armatures *ss*3 and *npr*3, operated armatures *ssr*3, and *str*3, conductor 21 to earth at the resting springs of the bay continuous routine key, Fig. 7. Relay SHR in operating, at armature *shr*4 completes a circuit to the lower winding of relay SHX (Fig. 11), which also operates, and at armature *shx*1 extends earth via the resting armatures *ona*2 and *npr*1, to the slow-to-operate relay ATR, Fig. 11, and in parallel thereto from armature *shx*1 via the resting armature *atr*2 to the winding of relay RAR.

Relay ATR is slow-to-operate and in case the access switch with which connection has been established happens to be standing off its home position at this instant, wiper 1 will encounter battery by way of a lamp such as 23, and a circuit will be completed by way of the interrupter springs *acm*, bank contact and wiper 7 of the secondary distributor SD, conductor 24, bank contact and wiper 3 of the switch auxiliary primary distributor APD, winding of relay AH to earth. Relay AH operates and at armature *ah*1 (Fig. 8) connects earth via armature *atr*1, springs of switch continuous routine key, operated armature *shx*3, winding of relay ONA to battery; relay ONA operates quickly so that at its armature *ona*2 a circuit is opened to the slow-to-operate relay ATR (Fig. 11). Relay ONA moreover at armature *ona*1 opens the circuit to relay BST (Fig. 11) upon the release of which the following circuit may be traced to the access switch driving magnet: earth at armature *ah*1, armature *bst*1, resting springs of switch continuous routine key, wiper 4 and bank contact of switch APD, conductor 25, wiper 8 and bank contact of switch SD, winding of magnet ACM to battery. Magnet ACM thereupon energizes in order to prepare for the advancement of the associated wipers, and at its interrupter springs *acm* opens the circuit of relay AH (Fig. 8) relay AH releases and opens the circuit of magnet ACM at armature *ah*1, so that the magnet de-energizes and advances the wipers onto the next set of bank contacts. Interaction between relay AH and the magnet ACM causes the wipers of the access switch ACS to be moved into the home position, whereat, due to the absence of battery encountered by wiper 1 of the switch ACS, relay AH will no longer be energized and the wipers will thus be brought to rest.

It must be mentioned that the circuit to relay ONA is opened for each successive step of the switch ACS, but as this relay is slow-to-release it remains operated during the stepping period. Relay ONA releases after a short interval and armature *ona*1 closes the circuit of relay BST (Fig. 11) which re-operates in order to prepare the circuit for the initial stepping of the access switch. Relay ONA in releasing at its armature *ona*2 again completes the circuit to relays ATR and RAR for a definite period, so that relay RAR will operate and lock up during the slow period of relay ATR, and upon the operation of this latter relay a circuit will be completed to relay AAR (Fig. 8) as follows: earth at the operated armature *atr*4 (Fig. 8) armature *rar*2, armature *shx*5, winding of relay AAR to battery. During the slow period of relay AAR an initial impulse is extended to the driving magnet of the access switch over the circuit: earth, armature *atr*4, armature *rar*2, armature *aar*2, armature *shx*4, armature *rpa*1, armature *atr*3, armature *bst*1, resting springs of switch continuous routine key, wiper 4 and bank contact, conductor 25, wiper 8 and second bank contact of the switch SDR, winding of magnet ACM to battery. Upon the operation of relay AAR after its slow period, the magnet circuit is opened at armature *aar*2, and the wipers of the access switch are accordingly advanced onto the second set of bank contacts. At armature *aar*3, Fig. 10, a circuit is completed to the relay RS which is slow to operate; in case the access switch wipers should encounter an unequipped position, wiper 6 will encounter battery by way of the resistance 22, which is common to all unequipped positions. A circuit is thereby completed to relay NPR (Fig. 8) as follows: battery, resistance 22, wiper 6, second bank contact and wiper 6 of the switch SD, conductor 18, second bank contact and wiper 2 of the switch APD, upper winding of relay NPR, armature *rs*8, conductor 17, to earth at the operated armature *st*3 (Fig. 5). Relay NPR operates quickly so that at armature *npr*2 the circuit is opened to the slow-to-operate relay RS (Fig. 10) before this relay has time to operate. Relay NPR in operating its armature *npr*4 (Fig. 11) again completes the circuit to operate relay NER as previously traced, and upon the operation of armature *ner*1, earth over conductor 20 will again be extended to the slow-to-operate relay NE and also in parallel by way of the resting armatures *ne*1, operated armature *shr*2, resting armature *rs*7, conductor 26, winding of relay PA (Fig. 8) to battery. Relays NE, NER and PA are thereby caused to inter-act one with the other and by this means earth impulses are extended to the access switch driving magnet over the following circuit: earth, armature *rs*1 (Fig. 8) resting contact of armature *tc*3, operated armature *pa*3, switch continuous routine key, wiper 4 and second bank contact, conductor 25, wiper 8 and second bank contact, winding of the access switch driving magnet ACM to battery.

Such interaction will cause the wipers of the access switch ACS to be rotated until the first equipped shelf is encountered; in this position wiper 6 will no longer encounter battery via resistance 22 and therefore relay NPR releases; relays NE and NER release, relay PA remains de-energized and at armature *npr*2 the following circuit will be completed: earth, operated armature *str*2 (Fig. 10) operated armature *aar*3, armature *npr*2, armature *tc*1, winding of relay RS to battery. Relay RS operates and at armature *rs*4 closes a holding circuit for itself.

It must be mentioned that when the test switch TS shown in Figs. 2 and 7 is in the home position and relay ST is operated, the following circuit is completed: earth, armature *st*8 (Fig. 3), winding of relay KD, conductor 27, first bank contact and wiper T1 of the test switch, resting armatures *k*2 and *am*2, interrupter springs and winding of test switch driving magnet TDM to battery. Relay KD operates in this circuit but the magnet does not operate, and at armature *kd*3 a circuit is completed as follows: earth, operated armature *st*8 (Fig. 3), armature *rer*2, operated armature *kd*3, armature *pa*1, winding of relay K to battery. Relay K operates in this circuit and at its armature, *k*4 completes a holding circuit for itself; as relay RS is also operated at this time a circuit is completed as follows: earth, operated armature *k*1 (Fig. 7), conductor 28, armatures *rer*1 and *rs*3, winding of relays RRS and HR in parallel to battery. Relay RRS and HR (Fig. 10) operate. Relay RRS in operating connects up test leads from the routiner to the access switch, at armature *rrs*1 (Fig. 3) the negative lead engaged by wiper 2 of the access switch is connected to the routiner, at armature *rrs*2 the positive lead engaged by wiper 3 of the access switch is connected to the routiner, at armature *rrs*3, the private wiper lead engaged by wiper 5 of the access switch is connected up, and at armature *rs*9 private lead P engaged by wiper 4 of the access switch is connected up. Furthermore, at armature *rrs*5, relay AR (Fig. 2) is connected to the first bank contact associated with wiper T4 of the test switch and as earth is connected to this wiper by the operation of armature *k*3, Fig. 3, relay AR thereupon operates. With both relays RS and AR operated, earth at armature *rs*5 (Fig. 3) is connected to the left-hand terminal of relay RG, whilst battery via resistance Y1 is connected to the right-hand terminal; under these conditions the high resistance relay RG operates and at its armature *rg*2 (Fig. 7) extends earth by way of armature *ar*1, first bank contact and wiper T5 of the test switch TS, winding of relay HSC to battery. Relay HSC (Fig. 7) operates and extends the earth connection via armature hsc2, armature k2, armature am2, interrupter springs tdm and winding of test switch driving magnet TDM to battery. The test switch driving magnet thereupon energizes, opens its own circuit at interrupter springs tdm, de-energizes, and advances the wipers into position 2.

In position 2 the initial energizing circuit to relay AR is opened at wiper T4, and in case the group selector engaged by the access switch is busy at this time, earth will then be extended over conductor P (Fig. 4) second bank contact and wiper 4 of the switch ACS, second bank contact and wiper 4 of the switch SD, conductor 29, second bank contact and wiper 4 of the switch PD, armature rs9, armature rg1, resting contacts associated with armature pt2, armature ar3, conductor 30, right-hand winding of relay AR to battery.

By this means relay AR is held operated even though its initial circuit is opened while relay HSC is released due to the movement of wiper T5 to the second position, and if this condition continues for a predetermined period an alarm is given. When relay K operated, earth impulses over conductor 31, Fig. 10, were extended by way of armature k5 to the alarm relay ALM; the first impulse operates this relay to its light armature alm1, upon the conclusion of the impulse the relay fully operates on both windings in series and at armature alm2 extends the impulse circuit to relay AM, so that upon the reception of the next earth pulse the latter relay will operate and connect up various alarm circuits which it is not proposed to describe in detail since they are already well known and do not form part of the invention.

Assuming now that earth is removed from conductor P (Fig. 4) due to the connection being released; the switching relay of the selector releases and completes the circuit of the release magnet so that the selector shaft restores to normal; relay AR (Fig. 2) releases, whereupon at armature ar4 (Fig. 3) earth is connected by way of the high resistance relay RG and switches PD, SD and ACS to conductor P of the selector switch under test. Relay RG holds operated from battery via the switching relay and interrupter relay in series in the group selector, and remains held until the shaft and wipers of the selector reach their home position whereat, the battery connection to the switching relay is opened at off-normal springs and relay RG releases. At armature rg1 a direct earth is connected to wiper 4 of the primary distributor PD in order to guard the group selector against seizure from the normal train of switches. By this means it will be appreciated that it is not possible for the routiner to apply a busying earth to the private conductor of a group selector while the switch is in an operated condition.

Returning now to the release of relay RG, earth at its resting armature rg2 is now connected to the second bank contact, associated with wiper T5 (Fig. 7) thereby again operating relay HSC which extends the earth circuit to the driving magnet TDM so that the wipers of the test switch are advanced into position 3 whereupon relay HSC releases. Relay HSC, upon operating, at its armature hsc1 opens the locking circuit of relay ALM before the next pulse operates relay AM, thereby preventing an alarm being given. In position 3 of the test switch, earth connected to wiper T6 (Fig. 7) is extended by way of the third bank contact, winding of relay TT to battery, whereupon this relay operates and at its earthed armature tt5 (Fig 7) completes a circuit by way of conductor 33, resting contacts of armature pt3, Fig. 3, armature c1, winding of relay PT to battery. Relay PT operates in the circuit described, at its armature pt3 completes a locking circuit to earth at armature k3, and at armature pt1 completes a circuit as follows: battery, left-hand winding of relay AR (Fig. 2), operated armature pt1, operated springs of start key SK2, resting springs of reset key RK1, to earth. Relay AR operates and at armature ar4 (Fig. 3) closes an operating circuit for relay RG. Relay TT in operating its armatures tt1 and tt2 connects up a differentially wound relay TN, Fig. 2, to bank contact 3 associated with wiper T2 which extends to the negative conductor of the group selector under test, and at armatures tt3 and tt4 connects up a similar differentially wound relay TX to the third bank contact associated with wiper T3 which extends to the positive conductor of the group selector; while at the same instant the high impedance retard RD is also connected in bridge across the negative and positive lines. Earth is connected to the upper winding of relay TX over wiper T4. If now the lines to the group selector are in correct condition a balanced bridge is formed and neither of the differentially wound relays TN or TX operate. If, however, the negative and positive lines should be in contact with battery or earth or are reversed in direction, either or both of the differentially wound relays will operate owing to the balanced bridge condition being thus destroyed, and will complete a circuit to the appropriate indicating lamp in series with relay DA, which is associated with the bank T6 of the test switch.

Assuming that the positive line is at a potential other than that produced by connection through a winding of the line relay of the selector to earth, relay TX will operate and at armature tx2 earth via wiper T6 standing on bank contact 3 will be extended over the armature tx2 and resting armature tn1, in series with the appropriate indicating lamp to battery via the winding of relay DA. Similarly if the negative line should be at a potential other than that produced by connection through a winding of the selector to earth, relay TN will then be operated and at armature $tn2$ a circuit will be completed to a different indicating lamp in series with relay DA. If now the lines are cross connected both relays TN and TX will be operated and here again earth on the bank contact 3, associated with wiper T6 will be extended via a still further indicating lamp to battery via relay DA. Consequently the lighting of a lamp provides an indication as to the nature of the fault. It should be mentioned that when relay ST operated it closed a point in the circuit of relay DR (Fig. 10) at armature $st9$ and relay DR is operated intermittently by earth impulses over conductor 11. Relay DA operates in series with the lamp and at armatures $da1$ and $da2$, Fig. 7, opens the stepping circuit of the driving magnet of the test switch TS. Assuming now that the lines test correct, relay DA will not be operated and as a result the following circuit may be traced to relay TS (Fig. 7); earth at armature $tt5$ (Fig. 7) resting armature $da1$, armature $dr2$, resting armature $ts2$, resting armature $da2$, right-hand winding of two-step relay TS to battery. Relay TS is operated to its light armature $ts1$ on the first impulse over the circuit described, at the conclusion of the impulse the relay operates completely over both windings in series, and at armature $ts2$ extends the impulsing circuit by way of the resting contact of armature $a1$, bank contact 3 and wiper T5 of the switch TS, thereby causing the magnet TDM to become energized to advance the wipers into position 4.

In position 4 relay TT is released, while the circuit is also opened to the negative and positive lines to the group selector under test at wipers T2 and T3. Relay TT opens the locking circuit of relay TS at armature $tts$ and relay TS releases. It should be mentioned that relay PG, Fig. 3, was operated from battery via resistance Y2 and operated armature $rrs4$ and completed a circuit to the relief relay PGR upon the operation of which earth at armature $pgr6$ is connected to bank contact 4 associated with wiper T5, so that the test switch will now advance its wipers into the fifth position.

In position 5 a resistance loop is connected across the negative and positive leads to the group selector, and may be traced from the wiper T3 of the test switch and bank contact 5, resistance Y8, bank contact 5 and wiper T2 of the test switch. By this means the line relay and the release relay of the group selector should be energized; upon the correct reception of earth over conductor P consequent upon the energization of the release relay a circuit may be traced as follows: earth, on conductor P, second bank contact and wiper 4 of the switch ACS, second bank contact and wiper 4 of the switch SD, conductor 29, second bank contact and wiper 4 of the switch PD, armatures $rs9$, $rg1$, $pt2$ to the right-hand terminal of relay PG, which is thereupon short-circuited and releases and is followed by the release of the relief relay PGR. Earth at resting armature $pgr6$ is connected to bank contact 5 associated with wiper T5 of the test switch, and the wipers are accordingly moved into the sixth position.

In position 6, the resistance loop is disconnected from the negative and positive leads; the line and release relays of the group selector thereupon de-energize, earth is removed from conductor P whereupon relays PG and PGR reoperate. At the operated armature $pgr6$, earth will be connected to the sixth bank contact and wiper T5 of the test switch to cause the wipers to be moved into the seventh position.

In position 7 a non-operate test resistance is connected across the negative and positive leads to the group selector over the following circuit: wiper T3 and seventh bank contact, resistance Y9, resistance Y5, resistance Y4, seventh bank contact and wiper T2; and assuming that the line relay in the group selector is in correct adjustment it will not operate under these circuit conditions. In consequence, relays PG and PGR will remain operated and after a short interval of time the following impulsing circuit will be completed to drive the test switch into its eighth position; earth at armature $k3$, wiper T4 and seventh bank contact, conductor 33, resting armature $da1$, impulsing armature $dr2$, armatures $ts2$ and $da2$ to relay TS which operates in the manner previously described and at armature $ts2$ extends the next impulse over armature $a1$, operated armature $pgr7$, seventh bank contact and wiper T5, to relay HSC and the driving magnet TDM which steps the wipers of the test switch into their eighth position.

In position 8, earth at wiper T4 is connected by way of the armature $dr1$, to relay OT which thereupon operates and locks by way of its armature $ot2$. The locking circuit of relay TS is opened at wiper T4 and this relay releases. At armature $ot1$, however, a point is closed in the circuit of relay TS which operates in the manner previously described. An operative test resistance is now connected across the negative and positive leads over the following circuit: wiper T3 and bank contact 8, resistance Y9, resistance Y5, bank contact 8 and wiper T2; so that if the line relay of the group selector is in correct adjustment it will operate, and in turn operate the release relay to connect earth to the lead P, whereupon relays PG and PGR (Fig. 3) release as previously described. At armature *pgr*7, an earth impulse is extended by way of the earth at the operated armature *ot*1 (Fig. 7), armature *da*1, impulsing armature *dr*2, armature *ts*2, resting armature *a*1, resting armature *pgr*7, operated armature *ot*3, bank contact 8 to wiper T5 in accordance with which the wipers of the test switch will be advanced into the ninth position.

In position 9 a test is made of the correct reception of the dial tone from the group selector. Earth connected to wiper T4 is extended by way of bank contact 9, resting armature *dtc*1, to relay DTR which thereupon operates and completes the following circuit across the negative and positive leads to the group selector: wiper T3 and bank contact 9, resistance Y9, resistance T12, windings of high impedance retard R in series, resistance Y11, operated armature *dtr*1, resistance Y6, to bank contact 9 and wiper T2. The line and release relays of the group selector energize and dial tone is extended back over from the selector over the circuit just traced, and since the retard R offers a very high impedance to the tone, an alternative circuit may be traced by way of the condenser Q2, primary winding of the transformer XFR and condenser Q3. In order that the dial tone shall produce a physical registration of its correct reception for the purpose of advancing the wipers of the test switch, the tone induced in the secondary winding of the transformer XFR is passed via three stages of thermionic valve amplification shown in Fig. 1, to the circuit of the alternating current relay TR, which thereupon operates and at its armature *tr*1 located near bank T5 of the test switch prepares a circuit for the advancement of the switch wipers at the correct instant. It must be mentioned that the valve filaments are lit at the commencement of the test, from earth at the operated armature *st*3, Fig. 5, extended over conductor 17, by way of suitable compensating resistance Y13, 14, 15, 16, 18 and 19 which have been included to reduce the potential across the filaments to the correct value, while associated with the input circuit of the last valve is a potentiometer designated Y17 which has been included to provide a ready means for adjusting the output to the alternating current relay TR.

Returning now to the operation of relay DTR which it will be remembered was connected to the bank T4 of the test switch, at armature *dtr*3 a circuit is prepared to relay IPG (Fig. 1) which is operated when the armature *dr*3 of impulsing relay DR next falls back and at its armature *ipg*1 extends the impulsing circuit to the two-step relay TGR, which accordingly operates after a suitable time period has elapsed, a time period sufficient to ensure the correct reception of the dial tone. Consequently, with relays TR, DTR and TGR operated, the following circuit may be traced for the advancement of the test switch: earth at operated armature *tr*1, Fig. 7, operated armature *tgr*3, operated armature *dtr*2, ninth bank contact and wiper T5 to relay HSC, and in parallel to the driving magnet TDM, whereupon the wipers are moved into the tenth position. It will be appreciated when all the first group selectors in the exchange have been routined and the access switches then encounter the second group selectors it is no longer necessary to test for the reception of dial tone, and to this end a special relay designated DTC (Fig. 5) is provided and operated over wiper 7 of the primary distributor when all the first group selectors have been routined. Relay DTC upon operating locks operated over a second winding for the remainder of the test cycle, and at armature *dtc*1 associated with the wiper and bank T4 of the test switch, disconnects the circuit to relay DTR so that during subsequent test cycles when wiper T4 encounters the bank contact 9, earth will then be extended to the test switch driving magnet TDM over wipers T4 and T5 so that the associated wipers will be advanced past this position.

In position 10 of the test switch TS the loop circuit to the group selector is opened and upon the release of the line relay and the release relay, earth will be removed off the conductor P and the short-circuit is removed from relay PG (Fig. 3) whereupon this relay will re-operate and in turn re-operate PGR, so that at armature *pgr*6 (Fig. 7) earth will be connected to bank contact 10 associated with wiper T5 of the test switch and the wipers will be accordingly moved into position 11. Relay DTR releases owing to its circuit being opened at wiper T4.

In position 11 a test is made of the guard on release feature of the group selector, that is to say, the slow releasing period of the guard relay.

Returning now to wipers T3 and T2, the following operating circuit may be traced to the group selector: wiper T3 and the 11th bank contact, conductor 35, wiper RT2 and first bank contact of the release timing switch RTS (Fig. 6) conductor 36, resistance Y9, resting contacts of armatures *sa*1, *btr*1 and *dtr*1, resistance Y6, bank contact 11, wiper T2; the line and release relays of the group selector operate and earth is again returned over conductor P to the battery side of the winding of relay PG, thereby causing this relay and in turn relay PGR, to release. It will also be seen from the drawings that earth connected to wiper T4 will be extended to relay RGT, which operates and holds by way of its armature *rgt*5, and at armature *rgt*3 (Fig. 6) opens the homing circuit to the release timing switch RTS, while at the same instant completing the following circuit to relay GIP: earth, armature *pgr*4 (Fig. 6), armature *rgt*4, winding of relay GIP, resistance Y22 to battery. Since relay GIP is short-circuited by the impulsing spring MPS which are impulsing at conveniently the rate of 20 pulses per second, it will be seen that relay GIP will not be operated until the springs next break contact, and when this occurs relay GIP at armature *gip*1 then transfers the impulsing circuit by way of armature *sz*3, first bank contact and wiper RT1 of the release timing switch RTS, winding of the driving magnet RDM to battery. Subsequent impulses are transmitted to magnet RDM (Fig. 6) over armature *rgt*3 and the switch RTS rotates its wipers round the associated bank contacts in synchronism with the impulse springs MPS. It will be noticed from the drawings that upon the first step of the wiper RT2 the holding circuit to the group selector under test is opened whereupon this switch will commence to restore to normal in the normal manner and during this releasing period the time will be counted on the banks of the switch RTS. When the slow releasing relay of the group selector eventually releases, earth will again be removed from conductor P so that relays PG and PGR will again operate and at armature *pgr*4 (Fig. 6) the impulsing circuit to the release timing switch driving magnet will be opened and the wipers will be held in a position which indicates the time taken by the group selector to restore to normal.

If now the group selector release relay is too long in releasing, the release timing switch wiper RT3 will come to rest on the lower group of commoned contacts and in this position earth will be extended from armature *pgr*4, armature *rgt*2, wiper RT3, and associated bank contact, over conductor 37 to operate an alarm signal which indicates "release relay slow"; similarly if the release period of the release relay is too short, wiper RT2 will then come to rest on the upper common group of contacts where connection is established over conductor 38, with the "release relay fast" signal. If the group selector fails to restore to normal when its circuit is opened, relays PG and PGR will not re-operate and as a result the wipers of the release timing switch RTS will be advanced to the 25th position where they are held since the stepping circuit is opened when wiper RT1 disengages the bank commoning. A circuit is then completed as follows: earth, resting armature *pgr*4 (Fig. 6) impulsing armature *dr*4, winding of relay LF, bank contact 25 and wiper RT1 to battery via the driving magnet RDM. Relay LF alone impulses in this circuit and at armature *lf*1 connects earth by way of wiper RT3 and bank contacts over conductor 37 which it will be remembered extended to the "release relay slow" signal. By this means a flashing signal is produced to indicate to the operator that the group selector has not released.

Assuming now that the release period of the group selector switch is within the permissible limits, then wiper RT3 will come to rest in a position which is between the alarm groups mentioned and in this case earth will be extended over conductor 39, 11th bank contact and wiper T5 of the test switch, thereby causing the wipers of the test switch to be stepped into the 12th position.

In position 12 an operating loop is again completed for the line relay of the group selector as follows: wiper T3, and bank contact 12 of the test switch (Fig. 2) resistance Y9, resting armatures *sa*1, *btr*1, *dtr*1, resistance Y6, bank contact and wiper T3. Relays PG and PGR release. At wiper T4 earth is extended to operate relay SEP which at armature *sep*4 prepares a locking circuit for itself and at armature *sep*2 (Fig. 3) earth is extended by way of armature *rrs*3, wiper 5 and second bank contact of switch PD, conductor 40, wiper 5 and second bank contact of switch SD, wiper 5 and second bank contact of switch ACS, over conductor PW which extends to the private wiper of the group selector under test.

The circuit of relay RGT (Fig. 2) is opened when wiper T4 leaves bank contact 11, relay RGT releases and completes the following homing circuit to the release timing switch RTS: earth at the interrupter springs *rdm* (Fig. 6) resting armature *rgt*3, bank commoning and wiper RT1, winding of the driving magnet RDM to battery. The wipers of the release timing switch RTS are thereupon rotated in a self-interrupted circuit until the home position is reached whereat the stepping circuit is opened at wiper RT1 and the following circuit may be traced for the stepping of the test switch: earth *a*, the resting armature *rgt*2, wiper RT3 and first bank contact, resting armature *pgr*2, operated armature *sep*7, conductor 41, bank contact 12 and wiper T4 of the test switch, to relay HSC and the driving magnet TDM to battery. The test switch thereupon steps into position 13.

In position 13 the loop circuit previously traced is maintained to the group selector. Earth connected to wiper T4 causes relay STS (Fig. 2) to operate. Armature *sts*7 completes a locking circuit to relay SEP which is held operated during the stepping of the test switch TS by means of its copper slug. Relay STS moreover, at armature *sts*3 (Fig. 5) completes the following circuit to relay PTR: earth at the resting armature *sz*2 (Fig. 2) conductor 42, armature *sts*3, winding of relay PTR to battery by way of resistance Y21. Relay PTR operates when the impulsing springs STS open and at armature *ptr*1 all subsequent impulses are transferred to the driving magnet SSDM of the sender switch SS. It must be mentioned that the impulsing springs SPS are operating at conveniently the rate of 10 cycles per second. Upon the first step of the wipers of the sender switch, relay SA operates from earth at wiper SS1, by way of the bank commoning and at its armature $sa1$ (Fig. 2) removes the short-circuit from a similar set of impulsing springs designated LPS, operating at the same speed and located in the loop circuit extending to the group selector switch. By this means impulses are delivered to the group selector at the normal speed, such as that produced by a subscriber's dial; when 9 such impulses have been delivered the wiper SS2 of the sender switch SS will encounter earth by way of the operated armature $sts6$, which is connected to bank contact 11, whereupon relay SZ is operated to again short-circuit the loop impulse springs LPS (Fig. 2) at armature $sz9$. At armature $sz2$ (Fig. 2) the impulsing circuit is opened to the switch SS and at armature $sz7$ (Fig. 5) the circuit is opened to relay SA and a homing circuit is completed to the switch SS. It must be mentioned that upon the operation of relay SZ and during the slow release period of relay SA, earth is connected to bank contact 13 and wiper T5, by way of operated armatures $sa2$ and $sz8$ and accordingly the wipers of the test switch are moved into position 14.

Returning now to the operation of relay SZ, it will be seen that at armature $sz1$ (Fig. 5) a point is opened in the homing circuit of the pause timing switch PTS, and at armature $sz5$, earth from armature $st3$ will be extended via the wiper PT2 and bank contact to the lower winding of relay SZ to battery, and in parallel therewith to the upper winding of relay CCL to battery. Relay CCL operates and at armature $ccl_1$ completes a locking circuit over conductor 43, by way of the resting armature $npr3$ (Fig. 11) operated armature $shr3$, armature $str3$, conductor 21, to earth via the resting springs of the continuous routine key.

If now the group selector has responded correctly to the impulses its shaft and wipers will be raised to the 9th level, in which position normal post springs are operated to return battery over conductor 44, second bank contact and wiper 6 of the access switch ACS (Fig. 9) second bank contact and wiper 6 of the switch SD, conductor 18, second bank contact and wiper 2 of the switch APD, upper winding of relay NPR, armature $rs8$, conductor 17, to earth at the operated armature $st3$ (Fig. 5). Relay NPR operates over the circuit described and at armature $npr5$ connects earth to the 14th bank contact associated with wiper T5, and the test switch wipers are thereupon moved into the 15th position. At armature $npr3$ (Fig. 11) the holding circuit is opened to the lower coil of the relay CCL (Fig. 5) so that this relay will not hold operated its armature $ccl_2$ (Fig. 2) and will thus prepare a point in the alarm circuit which would be given in case the group selector had not responded correctly, in which case the normal post springs would not be operated and relay NPR would also not be operated.

In position 15, a test is to be made of the correct reception of busy tone from the group selector in a similar manner to that described for the reception of dial tone. Since, as was previously described, the test wiper of the group selector was connected to earth by the operation of armature $sep2$, at the conclusion of the vertical impulsing period the switch will be automatically rotated in known manner to its 11th position, where busy tone is connected up. In order to provide a means for ascertaining the speed of rotation of the group selector, the following circuit is also brought into operation simultaneously with the commencement of the automatic rotation period of the group selector. Consequent upon the operation of relay SZ at the conclusion of the vertical impulsing period previously mentioned, a circuit may be traced from earth at armature $sz4$ (Fig. 6) winding of relay GIP to battery by way of the resistance Y22, and when the impulsing springs MPS which it will be remembered were impulsing at conveniently the rate of 20 per second, open their contacts, relay GIP will then operate and at its armature $gip1$ extend these impulses over the operated armature $sz3$, conductor 45, to the driving magnet PTDM of the pause timing switch PTS. By this means the wipers of the pause timing switch will commence to rotate in step with the impulse springs MPS at the same instant as the group selector switch wipers commence to rotate to their 11th position.

Assuming now that the automatic rotation of the switch under test proves to be too slow, wiper PT2 will have reached the unwired position 6 and released relay SZ before the group selector wipers have reached the 11th position. Consequently the loop circuit is now open to relay SEP, Fig. 2, which thereupon releases and disconnects earth from the private wiper of the group selector switch which now seizes the first idle trunk and in consequence the busy tone is not received by the routiner. If, however, the group selector switch is in correct adjustment the wipers will have reached their 11th position before the wipers of the pause timing switch reach the unwired position and consequently busy tone is thereupon returned over the negative and positive conductors in known manner. As the wiper T4 of the test switch is standing on the 15th position at this time relay BTR (Fig. 2) is operated and at armature $btr1$, the busy tone circuit is completed by way of the primary winding of the transformer XFR and is thereby induced into the secondary winding, and from thence extended by way of the valve amplifying equipment shown in Fig. 1, to operate the alternating current relay TR. Relay TR in operating its armature $tr1$, located by the bank T5, Fig. 7, prepares a point in the stepping circuit of the test switch. Relay BTR in operating its armature $btr4$, Fig. 1, completes a circuit to operate relay IPG and in turn the two-step relay TGR in the manner already described, and when both relays IPG and TGR are operated after a suitable period of time, the following circuit may be traced to effect the advancement of the test switch wipers onto the next position: from earth at the operated armature $tr1$, operated armature $tgr3$, armature $btr5$, resting armature $a4$, bank contact 15 and wiper T5 to relay HSC and from thence to the driving magnet TDM of the test switch TS.

In position 16 the group selector is released, and upon the re-operation of relays PG and PGR consequent upon earth being removed off the conductor P, the test switch is advanced into position 17, from earth by way of the operated armature $pgr6$.

In position 17, earth at wiper T4 is extended by way of conductor 33, resting armature $da1$, pulsing armature $dr2$, resting armature $ts2$, resting armature $da2$ to battery via the right-hand winding of relay TS, which fully operates at the conclusion of the first earth pulse, so that the subsequent earth pulses will then be transferred by way of its operated armature $ts2$, to the bank contact 17 and wiper T5 of the test switch, thereby advancing the wipers into position 18.

In position 18, relay STS is again operated from earth at the wiper T4 and at armature $sts3$ (Fig. 5) completes the circuit to relay PTR, which operates to extend the impulsing circuit to the sender switch driving magnet SSDM, whereupon a further 9 impulses are delivered to the group selector over the circuit: wiper T3 and bank contact 18, impulsing springs LPS, resting armatures $btr1$, $dtr1$ and $b1$ to bank contact 18 and wiper T2. Since relay SEP is no longer operated at this period a high resistance shunt is connected across the impulsing circuit to the group selector and may be traced from one side of the impulsing springs LPS, armatures $btr1$ and $dtr1$, resting armature $sep1$, operated armature $sts5$, and the resistance Y17, to the other side of the impulsing springs.

Assuming now that the switch responds correctly with the shunt resistance Y17, connected across the impulsing circuit, the wipers will accordingly be raised to the 9th level where they will automatically cut in to find a free trunk since at this stage relay SEP is not operated and the private wiper of the group selector is therefore not connected to earth. It must also be mentioned that upon the re-operation of relays SSA and SZ at the conclusion of the vertical stepping period, earth by way of armatures $sa2$ and $sz8$ (Fig. 7) is connected to bank contact 18 and the wiper T5, and the test switch is advanced into position 19.

In position 19 earth at the wiper T4 causes relay A to be operated, in order to prepare the circuit for the subsequent impulsing of the group selector in case a free trunk is not encountered upon the last operation. When relay SZ releases, the following circuit may be traced: earth, operated armature $a5$ (Fig. 2) resting armatures $sz6$, $ccl_2$ and $c2$, winding of relay BTR to battery; in case the group selector should encounter an all trunks busy condition instead of finding an idle trunk, busy tone will again be extended over the circuit previously traced to the valve amplifying equipment in order to effect the operation of the alternating current relay TR, which in operating brings in relays IPG and TGR after a suitable period. Upon the complete operation of relay TGR, the following circuit is completed to relay B (Fig. 7); earth, operated armatures $tr1$, $tgr3$, $btr5$, $a4$, left-hand winding of relay B to battery, whereupon relay B operates and at armature $b5$ completes a locking circuit for its right-hand winding by way of the armature $a3$, to earth at the operated armature $rg2$, and, moreover, at armature $b1$ (Fig. 2) opens the holding circuit to the group selector, and at armature $b3$ completes the following circuit to relay C (Fig. 2); earth, operated armature $a5$, resting armature $sz6$, resting armature $ccl_2$, operated armature $b3$, lower winding of relay C to battery. Relay C then locks operated by way of its armature $c2$, and opens the locking circuit to relay BTR which releases and at armature $c1$ (Fig. 3) opens the locking circuit to relay PT which thereupon releases and at its armature $pt1$ opens the holding circuit to the left-hand winding of relay AR (Fig. 2). Relay AR releases and at its armature $ar4$ (Fig. 3) extends earth by way of armature $rs5$, and the winding of high resistance relay RG, to the private conductor and from thence to battery via the switching relay of the group selector so that it will be appreciated that relay RG will be held operated until the group selector actually reaches its normal position, whereupon the off-normal springs open the battery circuit of the switching relay, thus permitting relay RG to release. Relay RG in releasing its armature $rg2$, associated with the bank T5, opens the holding circuit to relay B which releases; at armature $b1$ (Fig. 2) again closes the loop to the group selector, and at armature $b3$ opens the initial energizing circuit to relay C and extends earth to operate relay STS (Fig. 2). Relay STS in operating, at armature $sts3$ (Fig. 5) completes an impulsing circuit to the sender switch driving magnet SSDM and by this means a further nine impulses are transmitted to the group selector, at the conclusion of which relay SZ will re-operate and lock by way of its lower winding and the wiper PT2 of the pause timing switch PTSW; and at armature sz6 opens the holding circuit to relay C which releases and prepares the circuit to BTR. Relay SZ moreover connects up the impulsing spring MPS at its armatures sz3 and sz4 (Fig. 6) over conductor 45 to the pause timing switch PTS which thereupon drives its wiper PT2 to an unwired position, whereupon relay SZ releases and at armature sz1 completes a homing circuit by way of wiper PT1, and the interrupter springs ptdm to the driving magnet PTDM thus causing the wiper PT1 to be advanced to an unwired position in order to prepare the switch for its next operation. Furthermore, relay SZ in releasing its armature sz6 causes earth to be again extended to relay BTR which thereupon operates and at armature btr1 prepares the routiner circuit for the reception of busy tone in case the next call should prove busy, and at armature btr2 (Fig. 7) completes the following circuit for the re-operation of relay PT (Fig. 3): earth, operated armatures a6 and btr2 (Fig. 7) conductor 33, resting armatures pt3 and c1, winding of relay PT to battery; relay PT operates and at armature pt1 (Fig. 2) completes a circuit to the left-hand winding of relay AR (Fig. 2) which relay thereupon operates and at armature ar4 (Fig. 3) re-operates relay RG. The routiner will continue to transmit nine impulses to the group selector and release until a free trunk is found.

Assuming now that a free trunk is found, relay TR (Fig. 1) will not again be operated, and as relay BTR (Fig. 2) is now held operated for a definite period, the following circuit will become effective: earth, armature a6 (Fig. 7) armature btr2, resting armature da1, pulsing armature dr2, resting armatures ts2 and da2, right-hand winding of relay TS to battery. Relay TS operates its light armature ts1 upon the reception of the first earth pulse, and at the conclusion of the pulse operates completely and locks up from the initial energizing earth over both windings in series; subsequent impulses will then traverse a circuit by way of operated armature ts2, operated armature a1, resting armatures tdr3 and b2, operated armatures btr3 and a2, left-hand winding of two-step relay TDR to battery. Relay TDR operates its light armature tdr1, and at the conclusion of the earth pulse, operates completely over both windings in series and extends the impulsing circuit by way of armature tdr3 to the 19th bank contact associated with wiper T5 of the test switch. Consequently after a certain period of time which is counted by the complete operation of both the two-step relays TS and TDR, an impulse will be extended to bank contact 19 and wiper T5, whereupon the driving magnet of the test switch will be energized to advance the wipers onto bank contact 20.

In position 20 the loop circuit to the group selector is maintained by way of the bank commoning on banks T2 and T3 of the test switch, and as relays PG and PGR will be normal at this time, owing to the circuiting earth being extended back from the group selector over conductor P, the following circuit may be traced for stepping the test switch into position 21; earth, resting armature pgr6 (Fig. 7) operated armature tdr4, bank contact 20 and wiper T5, to relay HSC and the driving magnet TDM.

In position 21 the loop circuit is opened at wipers T2 and T3 whereupon the switch seized by the group selector under test restores to normal earth is thereby removed off the holding conductor which extends to the switching relay in the group selector under test. Since, however, relay PG is still connected to the private conductor, the switching relay in the group selector under test will be held operated in series therewith, and moreover, since direct earth is no longer connected to the private conductor, relay PG will be permitted to operate from battery via the relatively low resistance Y2. Upon the re-operation of relay PG and in turn relay PGR, earth at operated armature pgr6 (Fig. 7) will be extended by way of the bank commoning lead to bank contact 21 and wiper T5, whereupon the test switch is advanced into position 22.

In position 22 earth from wiper T4 (Fig. 2) operates relay SWT, and at armature swt1 (Fig. 3) direct earth will be connected to the battery side of relay PG which thereupon releases, but it must be mentioned that the switching relay in the group selector under test remains held from this short-circuiting earth. Relay PG in releasing in turn releases PGR, whereupon earth at the operated armature swt4 will be extended via the resting armature pgr1 to relay TD. Relay TD operates and completes a locking circuit by way of its armature td2 to earth at the operated armature swt1. Upon the operation of relay TD the short-circuiting earth extending to the battery side of relay PG will now be removed, and if the switching relay in the group selector under test is still held the following circuit may be traced for the re-operation of relay PG: battery, via the relatively low resistance Y2, operated armature swt3, resting armature sep2, operated armature rrs3, wiper 5 and second bank contact of the switch PD, conductor 40, wiper 5 and second bank contact of the switch SD, wiper 5 and second bank contact of the switch ACS, conductor PW to the private wiper of the group selector under test, and from thence via the operated contacts of the switching relay to the conductor P, second bank contact and wiper 4 of the switch ACS, second bank contact and wiper 4 of the switch SD, conductor 29, second bank contact and wiper 4 of the switch PD, operated armatures rs9, rg1 and pt2, winding of relay PG to earth. The re-operation of relay PG, therefore, at this stage tests for the correct operation of the switching relay of the group selector. Relay PGR also re-operates and at armature pgr6 (Fig. 7) earth is extended by way of the bank commoning, operated armature td1, bank contact 22 by way of wiper T5 to relay HSC and the driving magnet TDM, whereupon the wipers of the switch TS are moved into position 23.

In position 23, the switching relay of the group selector under test remains held from earth via relay PG, relay CT operates over wiper T4 and at armature ct1 (Fig. 7) opens the circuit to the alarm conductor for the loop test and closes the circuit of relay TT. Relay TT operates and connects the differential relays TN and TX to the negative and positive conductors, in order to make a test through the wipers of the group selector switch under test to the succeeding switch for contact with incorrect potential. At armature ct3 (Fig. 3) earth is extended over conductor 46, to complete the potential feed from the high impedance retard RD (Fig. 2) which is bridged across the negative and positive conductors during the foregoing test.

Assuming now that the connection to the succeeding switch proves correct, neither relays TN nor TX will be operated, therefore, relay DA (Fig. 7) will also not be operated and the following circuit will become effective to the two-step relay TS: earth, operated armature ct2 (Fig. 7) resting armature dr2, pulsing armature dr2, resting armatures da1, pulsing armature dr2, resting armatures ts2 and da2, right-hand winding of relay TS to battery. Relay TS operates completely at the conclusion of the first earth pulse and extends to pulsing circuit to bank contact 23 associated with wiper T5 so that upon the reception of the next pulse the wipers of the switch TS will be moved into position 24.

In position 24, earth at the wiper T4 operates relay TC, which locks by way of its armature tc4, over conductor 47, resting armature kd1, to earth at the armature st8. At armature tc1 (Fig. 10) the holding circuit of relay RS is opened which thereupon releases and in turn at armature rs3 opens the holding circuit to relay RRS. Relay RS in releasing its armature rs1, closes the circuit by way of operated armature tc3 to relay PA (Fig. 8) which operates and at armature pa1 (Fig. 3) opens the circuit of relay K, which in turn releases. Upon the release of relay K the following homing circuit may be traced for the test switch TS: earth, resting armature k1 (Fig. 7) bank commoning and wiper T1, resting armatures k2 and am2, interrupter springs tdm and driving magnet TDM to battery. By this means the wipers of the test switch are rotated to the home position in a self-interrupted circuit, and at the bank contact 1, battery via the driving magnet is extended over conductor 27, to effect the re-operation of relay KD, which at armature kd1 (Fig. 3) opens the holding circuit to relay TC, so that relay TC releases. Relay TC in releasing its armatures tc3 opens the circuit to relay PA, Fig. 8, and during the slow release period of this latter relay an impulse is delivered to the driving magnet ACM of the access switch over the following circuit: earth, resting armatures rs1 and tc3, operated armature pa3, resting springs of continuous routine key, wiper 4 and second bank contact of the switch APD, conductor 25, wiper 8 and second bank contact of the switch SD, winding of the driving magnet ACM to battery, whereupon the wipers of the access switch are moved into engagement with the next group selector switch on the particular shelf which is being routined. Upon the release of relay PA, after its slow period, the circuit to relay RPA (Fig. 11) is opened at armature pa2, and during the slow release period of this latter relay, earth at armature shx2 is extended via the resting contacts of armature pa2, operated armature rpa3, winding of relay RAR to battery, so that relay RAR operates and at armature rar2 completes the circuit to relay AAR (Fig. 8) which operates and at armature aar3 a circuit is completed to relay RS (Fig. 10) which thereupon operates and locks by way of its armature rs4. Relay RS also completes the circuit to relays RRS and HR and the routine cycle is now started on the next group selector in the manner already described.

If the next switch position had been unequipped wiper 6 of the access switch ACS would encounter battery via resistance 22, and accordingly relay NPR (Fig. 8) would be operated over a circuit previously traced, and as will be remembered from the previous description, relay NPR causes relays NER, NE and PA to interact one with the other and the access switch would accordingly be advanced to find the next equipped position. It will also be noticed that at armature npr2 (Fig. 10) the circuit to relay RS is held open so as to suspend the re-start of the routine test cycle, until the next group selector switch has been located. When all the group selectors on a particular shelf have been routined, the wipers of the access switch will come to rest in position 22, where relay SS (Fig. 9) is operated from earth via relay AH (Fig. 8) which also operates and interacts with the driving magnet ACM so as to cause the wipers of the access switch ACS to be driven to the home position. Relay SS it must be mentioned is held operated while the wipers are being stepped due to the retaining effect of its copper slug, and at armature ss5 (Fig. 11) extends earth via the resting armature ps2, to operate relay AP (Fig. 11) which in turn at armature ap1, extends earth from operated armature str7 (Fig. 8) over conductor 48, operated armature ap1, winding of relay RAP (Fig. 11) to battery. When now the access switch wipers reach the home position, relay SS will be released owing to its circuit being opened at wiper 1 of the access switch ACS, and at armature ss5 the circuit is also opened to relay AP (Fig. 11) and moreover during the slow release period of this latter relay, an impulse is delivered to the driving magnet of the secondary distributor switch over the circuit: earth at resting armature ps2 (Fig. 11), armature ss5, conductor 49, operated armature ap2 (Fig. 8) resting armature ahr1, conductor 14, resting springs of continuous routine key, conductor 15, wiper 6 and second bank contact of the switch APR, winding of the secondary distributor driving magnet SDM to battery, whereupon the wipers of the switch SD are moved into engagement with the next set of bank contacts. Upon the release of relay AP after its slow period, the circuit to relay RAP (Fig. 11) is opened at armature ap1, and during the slow release period of this latter relay earth connected to the resting armature ap1 is extended via the operated armature rap3, to relay RSR (Fig. 11) which operates and at armature rsr2 completes the circuit to relay SSR (Fig. 8) and in turn relay SHR (Fig. 11) as previously explained. Relay SHR in re-operating at armature shr4 operates relay SHX and upon the operation of relay SHX, at armature shx1 circuits are again completed to relays ATR and RAR, Fig. 11, which, in turn complete a circuit to relay AAR (Fig. 8) and during the slow operating period of this latter relay an impulse will be delivered to the magnet ACM of the selected access switch over armatures atr4, rar2, aar2, shx4, rpa1, atr3 and bst1 in order to advance the wipers onto the second set of contacts in readiness for the test cycle. In case now the secondary distributor should have been stepped onto a set of bank contacts associated with an unequipped shelf, wiper 6 would then encounter battery via the resistance 17 and relay HPR would again be operated thereby at armature npr3 holding open the circuit to relay SHR (Fig. 11) and interaction will then take place between relays NER, NE and AP to step the secondary distributor switch wipers to find the next equipped shelf.

When now the last shelf associated with a particular secondary distributor switch such as SD, is being routined the wipers of the switch SD will be standing on the 25th set of bank contacts in which position earth connected to wiper 1 of switch SD will be extended via the operated armature shr5, to the left-hand winding of relay APS, whereupon this latter relay operates and at its armature aps2 completes a locking circuit to its right-hand locking winding by way of the resting armature bps1, and at armature aps1 (Fig. 3) completes a circuit to the slow-to-operate relay BPS which also operates and at its armature bps2 prepares a circuit to relay PS. When all the switches on this particular shelf have been routined the access switch will return to its home position in the manner already described and magnet SDM of the secondary distributor will receive an impulse to cause its wipers to be advanced onto the next set of bank contacts, which in this case happens to be the home position. Consequently, in this position the circuit is opened to relay APS which releases and at armature aps1 opens the circuit to relay BPS (Fig. 3). During the slow release period of relay BPS, earth at the resting armature aps1 is extended by way of the operated armature bps2 to relay PS which operates and at armature ps1 opens the holding circuit to relay AST (Fig. 3) which also releases. Relay AST in releasing at armature ast2 (Fig. 3) opens the holding circuit by way of the bank commoning to relay SRR (Fig. 8) whereupon the following relays are released in turn: relay STR (Fig. 11), relays SHR and SHX (Fig. 11) relays RS and RRS (Fig. 10) and relay ATR (Fig. 11). Relay BPS releases after its slow period and at armature bps2 opens the circuit to relay PS and during the slow release period of the latter relay an impulse is delivered to the driving magnet of the primary distributor switch PD over the following circuit: earth, resting armatures aps1 and bps2, operated armature ps3, resting armatures rsh1 and cr2, winding of the driving magnet PDM to battery, thereby causing the magnet to become energized. When relay PS eventually releases after its slow period, the wipers of the primary distributor switch PD are advanced on to the next set of bank contacts. Relay PS in releasing also causes the routiner to be restarted upon another group selector switch in the manner previously described.

Indicating lamps showing the progress of the test are connected in circuit over wiper T6 of the test switch TS and as each test is performed the appropriate lamp is lit. The various indicating lamps are lighted in the following positions of the test switch:

1. Connection to group selector.
2. Group selector busy.
3. Test for incorrect potential on speaking conductors.
4. Release of group selector.

5. Earth returned on private conductor.
6. The same as 4.
7. Non-operation of line relay.
8. Operation of line relay.
9. Reception of dial tone.
10. The same as 4.
11. Release guard timing.
12. Earth returned on private conductor.
13. Transmission of nine impulses with series resistance.
14. Cut-in on correct level.
15. Reception of busy tone.
16. The same as 4.
17. ⎫ Transmission of nine impulses with
18. ⎭ shunt resistance.
19. All trunks busy.
20. Earth returned on private conductor.
21. Loop opened, no earth on private conductor.
22. Switching relay operated.
23. Loop test to succeeding switch.
25. ⎫ Test cycle completed.
26. ⎭

Hence the attendant is able to note at any time which test is being conducted and since the test switch TS is maintained in position in the event of a fault being found and the test stopped, the nature of the fault is at once indicated.

A description will now be given of the various continuous routine keys which are provided for continuously routining the following:
(a) An individual switch.
(b) Any particular shelf.
(c) Any particular bay.
(d) Any particular group of four bays.

Referring now to case (a) above, the start key is first restored and the switch continuous routine key SCRK is then operated and at one set of springs scrk1 (Fig. 11) the automatic stepping circuit is opened to the driving magnet SDM of the secondary distributor switch. At springs scrk2 (Fig. 8) a circuit is opened to prevent the operation of relay ONA, at springs scrk3 (Fig. 8) opens the automatic stepping circuit to the driving magnet ACM of the access switch ACS, and at springs scrk4 (Fig. 7) completes an operating circuit to relay CR. Under these conditions the primary distributor, the secondary distributor and the access switch may be set by hand in the following manner:

Upon the operation of the primary distributor stepping key PDSK (Fig. 3) earth over conductor 50 from the resting springs of the start key is extended by way of the operated armature cr2 to the magnet PDM of the primary distributor switch, so that by the intermittent operation of key PDSK the wipers may be advanced into the position desired, while the lighting of the various indicating lamps from earth connected to the wipers show definitely the various bays which are connected with as the wipers move from from contact to contact. Having thus set the primary distributor on the correct set of bank contacts, the secondary distributor stepping key SDSK (Fig. 11) may then be operated whereupon earth from the resting springs of the start key will then be extended by way of the operated contacts of the key SDSK, operated contacts of scrk1, conductor 15, wiper 6, and second bank contact of the switch APD, Fig. 8, secondary distributor driving magnet SDM to battery. The intermittent operation of stepping key SDSK results in the wipers of the secondary distributor switch being advanced to the desired set of bank contacts, while the position of the wipers may be checked from time to time by the glowing of the indicating lamps which are lit from earth connected to wiper 1.

Having thus set the primary distributor and the secondary distributor in the desired positions, the access switch stepping key ACSSK (Fig. 8) may then be operated and earth will be extended over conductor 50 from the resting contacts of the start key, operated springs scrk3, wiper 4 the second bank contact of the switch APD, conductor 25, wiper 8 and second bank contact of the switch SD, access switch driving magnet ACM to battery. The intermittent operation of the key ACSSK (Fig. 8) causes the wipers of the access switch ACS to be advanced to the desired position, while the lighting of the indicating lamps from wiper 1 shows when this position has been reached. Having thus established connection with the desired group selector the start key SK (Fig. 11) may be operated, the routiner then proceeds to apply the cycle of tests to this particular switch as long as the start key remains operated.

Referring now to case (b) the shelf continuous routine key SHCR is operated and at springs shcr1 completes the circuit to relay CR (Fig. 7) and at springs shcr2 (Fig. 11) opens the automatic stepping circuit to the driving magnet SDM of the secondary distributor switch, and at springs shcr3 (Fig. 7) opens the circuit to relay ONS (Fig. 8). Under these conditions the primary distributor may be advanced to the desired position by the intermittent operation of the stepping key PDSK in the manner already described and when the connection has been established with the correct secondary distributor SD, this latter switch may then be stepped by the intermittent operation of the secondary distributor switch key SDSK in order to connect up the access switch having access to the desired shelf. The operation of the start key SK causes the routiner to apply the usual test by way of this particular access switch and since the springs scrk3 (Fig. 8) of the switch continuous routine key are not operated on this test, the automatic stepping circuit to the access switch driving magnet ACM will obtain. Referring now to case (c), the bay continuous routine key BCR (Fig. 7) is operated, thereby opening the normal start circuit over conductor 21 to relay SHR (Fig. 11) and also completing an operating circuit to relay CR and preparing a circuit to the lower winding of relay NPR (Fig. 8). The primary distributor is now advanced into engagement with the correct secondary distributor by the intermittent operation of the stepping key PDSK and when this has been done one of the four bay selecting keys designated BSK1 to BSK4 (Fig. 7) is operated.

Assuming now for example that the key BSK2 is operated, in this case when the start key SK is operated the magnet SDM of the secondary distributor switch will receive its initial step over the usual circuit, and its wiper 1 will be moved into engagement with the second bank contact where a circuit will be completed for the indicating lamp AB in series with relay U. Relay U thereupon operates over this circuit and its armature u2 (Fig. 7) completes the following circuit: earth, armature u2, resting springs of key BSK1, operated springs of key BCRK, conductor 51, lower winding of relay NPR (Fig. 8) to battery. Relay NPR operates and completes a circuit which causes the interaction of relays NER, NE and AP as previously described, and by this means pulses will be delivered to the magnet SDM of the secondary distributor switch to advance its wipers in search of the particular bay it is desired to routine. By this means the switch SD will automatically step until its wiper 1 encounters the circuit of the first lamp which is connected to relay V, and in this position relay U will release and at its armature u2 open the circuit to relay NPR which thereupon releases and stops the interaction circuit between relays NER, NE and AP, so that the wipers of the secondary distributor are brought to rest. Since, however, the key BSK2 (Fig. 7) is operated, earth at the operated armature v2 will be extended via the key BSK2 over conductor 21 to operate relay SHR, whereupon the routine cycle will be started in the manner already described, and will proceed until the whole of the bay has been covered. When now the whole of the bay has been routined, wiper 1 of the secondary distributor SD will be advanced out of engagement with the circuit of relay V which latter will thereupon release and relay W will be operated. Relay V in releasing, opens the circuit to relay SHR, thereby stopping routining operation, and upon the operation of relay W, earth at armature w2 (Fig 7) will be extended via the resting springs of the key BSK3, operated key BCRK, conductor 51, lower winding of relay NPR (Fig. 8) whereupon this relay again operates and completes the automatic stepping circuit to the driving magnet SDM of the secondary distributor switch. By this means the wipers of the secondary distributor switch are automatically rotated over the contacts extending to the remaining three bays, and when wiper 1 again encounters the circuit of relay V, this latter will again operate thereby opening the circuit to NPR and completing the circuit to relay SHR, whereupon the routine test will again be applied on this particular bay.

Referring now to case (d), the operations here will be the same as those described for (c) with the exception that all the bay selecting keys BSK1 to BSK4 are operated, so that it will be appreciated that upon the operation of the start key the routiner will proceed to continuously routine over all four bays.

A reset key is also provided in case a faulty group selector is encountered and it is desired to repeat the routine test cycle of this same switch, when the fault has been cleared. When the reset key RK is operated, at springs rk1 (Fig. 2) the circuit is opened to relay AR and at springs rk2 (Fig. 6) the circuit is completed to relay RER which operates and at armature rer3 extends locking circuit by way of the resting armature kd2, over conductor 17, to earth at armature st3 (Fig. 5). Relay RER in operating at armature rer2 (Fig. 3) opens the circuit of relay K which releases thereby restoring the test switch TS to its home position, and as relay TC is not operated due to the absence of earth at wiper T4, the access switch driving magnet ACM will not receive an impulse, and is therefore prevented from stepping the wipers into engagement with the next group selector switch. At the conclusion of the homing operation, relay KD operates over wiper T1 and conductor 27 and opens the holding circuit to relay RER which therefore releases, and allows relay K to again operate and start the test cycle on the same group selector switch.

A step-on key is also provided in case a fault is encountered which cannot be conveniently dealt with immediately, and it then becomes necessary to step the routiner access switch onto the next group selector. When the step-on key SOK (Fig. 6) is operated, the circuit is completed to relay SO, which locks by way of its armature so1, to earth via the resting armature kd2, and at armature so2 operates relay RER which also locks, and causes the test switch to return to its home position in the manner already described but since relay SO is also operated during this period the circuit is completed to relay TC (Fig. 2) at armature so3 so that the access switch driving magnet ACM receives an impulse to step the wipers into engagement with the next group selector switch. Relay KD operates when the test switch arrives at its home position and opens the circuits of relays RER and SO at armature kd2.

Various alarm circuits are also provided and shown in Fig. 10 of the assembled circuit. Battery is fed to the stepping magnets of all the switches concerned via the low resistance relay RMB over conductor 53 so that in case a magnet should stick the circuit is completed to relay RMB for a definite period, and this relay thereupon at armature rmb1 operates relay RA and the latter at armature ra1 completes the following circuit to the two-step relay ARA: earth impulses over conductor 31 (Fig. 10) resting armature ara2, operated armature ra1, lower winding of relay ARA to battery; thereby causing the relay to operate its light armature ara1, and at the conclusion of the earth pulse the relay operates completely over both windings in series, and at armature ara3 extends earth via the low resistance relay FA in series with the release alarm lamp RAL to battery. The lamp lights in this circuit, and at armature fa2 a circuit is also completed to the rack pilot urgent alarm lamp RPU which also lights; and at armature fa1 the following circuit is completed to relay AM (Fig. 10): battery via the lower winding of relay AM operated armature fa1, key ALMK, springs rsk2, conductor 55, springs rk1 to earth. Relay AM thereupon operates and at armature am3 connects up the alarm bell ALB and at armature am4 completes a circuit to the rack pilot lamp RPL, and at armature am5 completes the circuit to the main exchange alarm over the main key and conductor 56, while at armature am1 the impulsing circuit is opened to relay DR to prevent the stepping of the test switch in the routiner.

When any of the foregoing alarm circuits are actuated, the routiner is locked up until the fault is located, whereupon the operation of the alarm cut-off key ALMK (Fig. 10) or the springs rsk2 restart key RSK2, will permit the routiner to carry on with the tests.

What we claim as new and desire to secure by Letters Patent is:

1. Routine testing apparatus for testing the selector switches of an automatic telephone exchange, each switch adapted when its calling loop circuit is closed to apply dial tone thereto, said apparatus including testing mechanism, means for selecting each selector switch and connecting the selected switch to said testing mechanism, thereby closing the calling loop circuit to the switch, said mechanism thereupon testing said switch for the application of dial tone to the closed loop.

2. Routine testing apparatus for testing the selector switches of an automatic telephone exchange, each of which has for one of its functions the application of dial tone to the calling loop circuit upon seizure of the switch for the extension of a call, said apparatus comprising means for seizing said switches one at a time, and testing mechanism for testing each seized switch for the application of dial tone to the calling loop, said mechanism responsive to dial tone applied by a seized switch for operating that switch and testing the other functions thereof during the operation.

3. Testing apparatus for testing the selector switches of an automatic telephone system, each of said switches adapted to apply a busy tone to the calling circuit when its wipers are automatically stepped to the eleventh rotary position due to an all-trunks-busy condition, said apparatus comprising means for selecting said switches one at a time, means for transmitting impulses to a selected switch to cause it to elevate its wipers to a desired level of contacts, means for connecting a busy potential to the test wiper of a selected switch to cause it to automatically rotate its wipers to the eleventh position, and means for thereupon testing said switch for said application of busy tone.

4. Testing apparatus for testing a selector switch of the type used in an automatic telephone system, which switch is adapted to rotate its wipers to an eleventh position when an all-trunks-busy condition is encountered, said apparatus comprising means for transmitting impulses to said switch to cause it to elevate its wipers to a desired level, means for simulating an all-trunks-busy condition to cause said switch to automatically rotate its wipers to the eleventh position, and means for timing the speed of rotation of said wipers.

5. Testing apparatus for testing a selector switch of the type used in automatic telephone systems, which switch is adapted to rotate its wipers to an eleventh position within a definite period of time when an all-trunks-busy condition is encountered, said apparatus comprising means for transmitting impulses to said switch to cause it to elevate its wipers to a desired level, means for simulating an all-trunks-busy condition to cause said switch to automatically rotate its wipers to the eleventh position, and means for determining whether said wipers reach the eleventh position within said period.

6. Testing apparatus for testing a selector switch of the type used in automatic telephone systems, which switch is adapted to rotate its wipers to an eleventh position within a predetermined period of time when an all-trunks-busy condition is encountered and in that position apply a busy tone to the calling circuit, said apparatus including means for transmitting impulses to said switch to cause it to elevate its wipers to a desired level, means for simulating an all-trunks-busy condition to cause said switch to automatically rotate its wipers to the eleventh position, and means including a timing device for testing said switch for said application of busy tone, said device effective if said switch wipers do not reach the eleventh position within said period of time for terminating said simulated condition to prevent said switch rotating its wipers to the eleventh position and applying said busy tone.

7. Testing apparatus for testing a selector switch of the type used in automatic telephone systems, which switch is adapted to operate normal post springs when it elevates its wipers to a certain level, said apparatus including means for transmitting a certain number of impulses to cause said switch to elevate its wipers, said number of impulses normally sufficient to cause said switch to elevate its wipers to said certain level and thereby operate said springs, and means including a circuit completed by the operation of said springs for testing said switch for correct response to said certain number of impulses.

8. Testing apparatus for testing a selector switch of the type used in automatic telephone systems, which switch is adapted as one of its functions to rotate its wipers to the eleventh position to apply a busy tone to the calling line circuit when an all-trunks-busy condition is encountered, said apparatus comprising a sequence switch which causes various tests to be applied to the selector in its various positions, means responsive to said sequence switch reaching a certain one of its positions for transmitting impulses to the selector to cause it to elevate its wipers to a desired level and for connecting a busy potential to the test wiper of the selector independently of the bank contacts to cause said selector to automatically rotate its wipers to the eleventh position of said desired level, and means operated by the busy tone applied by the selector in the eleventh position for operating said sequence switch to its next position to cause the application of the next test.

9. Testing apparatus for testing a selector switch of the type used in automatic telephone systems, which switch is adapted to automatically rotate its wipers over a level of contacts step-by-step to select an idle trunk to a succeeding switch, said apparatus comprising means for transmitting impulses to the selector to cause it to elevate its wipers to a desired level and then automatically rotate its wipers into engagement with the contacts of an idle trunk, and means for thereafter testing the selected trunk through the selector to determine the polarity of the current supplied by the succeeding switch.

10. Testing apparatus for testing a selector switch of the type employed in automatic telephone systems, which switch is adapted to rotate its wipers to the eleventh position when an all-trunks-busy condition is encountered and in that position apply a busy tone to the calling line circuit, said apparatus including means for transmitting impulses to the selector to cause it to elevate its wipers to a desired level and then automatically rotate its wipers to select an idle trunk, means operated by the busy tone each time it is applied by the selector when its wipers are rotated to the eleventh position for causing the selector to restore its wipers to normal, and means for thereafter causing said first means to again transmit impulses to again cause the selector to elevate its wipers to said desired level and then automatically rotate them to select an idle trunk.

11. Testing apparatus for testing a selector switch of the type used in automatic telephone systems which is adapted to rotate its wipers to an eleventh position to apply a busy tone to the calling line circuit when an all-trunks-busy condition is encountered, said apparatus including means for transmitting impulses to the selector to cause it to elevate its wipers to a desired level and then automatically rotate its wipers in a step-by-step manner to select an idle trunk, a timing device, and means operated by the busy tone applied to the calling circuit by the selector due to the selector rotating its wipers to the eleventh position upon failing to find an idle trunk for starting the operation of said timing device and for causing said selector to restore its wipers to normal, said device effective at the end of an interval sufficient for said selector to restore its wipers for causing said first means to again cause the selector to elevate its wipers to said desired level and again automatically rotate the wipers to select an idle trunk.

12. Testing apparatus for testing a selector switch of the type used in automatic telephone systems, which switch has a switching relay adapted to connect the release trunk conductor of the selector to the test wiper thereof when the selector has found an idle trunk leading to a succeeding switch, said apparatus including means for transmitting impulses to the selector to cause it to raise its wipers to a desired level and then automatically rotate the wipers to select an idle trunk, means for applying a special potential to said test wiper independently of said release trunk conductor and the bank contacts, and means for testing said release trunk conductor for said special potential to check the operation of said switching relay.

In testimony whereof we the said OWEN AVIS PEARCE and LANCELOT MARTIN SIMPSON have signed our names at Liverpool, England, this 13th day of May, 1930.

OWEN AVIS PEARCE.
LANCELOT MARTIN SIMPSON.